(12) United States Patent
Uyama

(10) Patent No.: US 8,359,159 B2
(45) Date of Patent: Jan. 22, 2013

(54) SYSTEM WHICH MEDIATES PROVIDING OF MAP INFORMATION, SERVER WHICH MEDIATES PROVIDING OF MAP INFORMATION, AND METHOD FOR PROVIDING MAP INFORMATION

(75) Inventor: Hiroshi Uyama, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 0 days.

(21) Appl. No.: 13/145,410

(22) PCT Filed: Jan. 26, 2009

(86) PCT No.: PCT/JP2009/051180
§ 371 (c)(1),
(2), (4) Date: Jul. 20, 2011

(87) PCT Pub. No.: WO2010/084615
PCT Pub. Date: Jul. 29, 2010

(65) Prior Publication Data
US 2011/0282579 A1    Nov. 17, 2011

(51) Int. Cl.
*G01C 21/32* (2006.01)
(52) U.S. Cl. ............... 701/453; 340/995.11; 340/995.12
(58) Field of Classification Search .................... 701/208
See application file for complete search history.

(56) References Cited

U.S. PATENT DOCUMENTS

| | | | | |
|---|---|---|---|---|
| 6,708,112 B1* | 3/2004 | Beesley et al. | ................ | 701/533 |
| 7,047,131 B2* | 5/2006 | Yoon et al. | .................... | 701/532 |
| 7,647,341 B2* | 1/2010 | Ojima | .......................... | 707/805 |
| 7,684,928 B2* | 3/2010 | Kodani et al. | ................ | 701/420 |
| 7,978,129 B2* | 7/2011 | Sawyer et al. | ........... | 342/357.48 |
| 8,005,612 B2* | 8/2011 | Asahara et al. | ................ | 701/452 |
| 8,144,058 B2* | 3/2012 | Sawyer et al. | ................ | 342/459 |
| 2005/0102101 A1* | 5/2005 | Beesley et al. | ................ | 701/209 |

(Continued)

FOREIGN PATENT DOCUMENTS

| | | |
|---|---|---|
| EP | 1560187 A1 | 8/2005 |
| EP | 2354760 A1 | 8/2011 |

(Continued)

OTHER PUBLICATIONS

International Search Report for PCT/JP2009/051180, mailing date of May 12, 2009.

(Continued)

*Primary Examiner* — Shelly Chen
(74) *Attorney, Agent, or Firm* — Westerman, Hattori, Daniels & Adrian, LLP

(57) ABSTRACT

When a map acquisition judgment means judges that the acquisition of map information is required, a terminal device transmits spot position information calculated by a spot information calculation means to a server which mediates providing of the map information, via a first map information providing server where the terminal device is positioned. The server causes an area judgment means to judge according to the spot information an area of providing map information including the spot, identifies a map information providing system on the basis of the judgment, and requests providing of the map information including the spot to a second map information providing server in the area according to the spot position information. The terminal device synthesizes map information held by the terminal and map information provided by the second map information providing server by a map synthesis means and displays the synthesized map information on a display means.

19 Claims, 12 Drawing Sheets

U.S. PATENT DOCUMENTS

| | | | |
|---|---|---|---|
| 2006/0080029 A1* | 4/2006 | Kodani et al. | 701/208 |
| 2006/0106534 A1* | 5/2006 | Kawamata et al. | 701/208 |
| 2006/0155462 A1 | 7/2006 | Sumizawa et al. | |
| 2007/0273558 A1* | 11/2007 | Smith et al. | 340/995.1 |
| 2008/0086262 A1* | 4/2008 | Asahara et al. | 701/208 |
| 2010/0228478 A1* | 9/2010 | You | 701/209 |
| 2011/0143768 A1* | 6/2011 | Lane et al. | 455/456.1 |
| 2011/0219027 A1 | 9/2011 | Uyama | |
| 2011/0241936 A1* | 10/2011 | Sawyer et al. | 342/357.48 |
| 2011/0276692 A1* | 11/2011 | Waldman et al. | 709/226 |

FOREIGN PATENT DOCUMENTS

| | | | |
|---|---|---|---|
| JP | 2001-004392 A | | 1/2001 |
| JP | 2001-165681 A | | 6/2001 |
| JP | 2003-097960 A | | 4/2003 |
| JP | 2003288004 A | * | 10/2003 |
| JP | 2005-141365 A | | 6/2005 |
| JP | 2007147632 A | * | 6/2007 |
| JP | 2007-232679 A | | 9/2007 |
| JP | 2007264387 A | * | 10/2007 |
| JP | 2007-322906 A | | 12/2007 |
| JP | 2008-293507 A | | 12/2008 |

OTHER PUBLICATIONS

Supplementary European Search Report dated Apr. 10, 2012, issued in corresponding European Patent Application No. 09838806 (10 pages).

Notification Concerning Transmittal of International Preliminary Report on Patentability (Form PCT/IB/326) of International Application No. PCT/JP2009/051180 mailed Aug. 4, 2011 with forms PCT/IB/373 and PCT/ISA/237.

* cited by examiner

SYSTEM WHICH MEDIATES PROVIDING OF MAP INFORMATION, SERVER WHICH MEDIATES PROVIDING OF MAP INFORMATION, AND METHOD FOR PROVIDING MAP INFORMATION

TECHNICAL FIELD

The present invention relates to a map information system for providing map information in a route search system, a facility search system, or another information-providing system, and more specifically relates to a system for providing map information in which a plurality of map information providing systems having predetermined areas as service areas are coordinated, and map information requested from a map information providing system in an adjacent service area is provided to a terminal device via a mediation server that includes a server which mediates providing of map information.

BACKGROUND ART

There are conventionally known navigation devices and navigation systems for searching a route from a desired departure point to a destination and providing guidance to a user using map data and road data, and examples of such navigation devices and navigation systems that have been implemented include car navigation devices that are mounted in an automobile and that provide route guidance to a driver, and communication-type navigation systems that send route search requests to a route search server and receive the results to receive route guidance using a mobile telephone as a terminal device for navigation.

In particular, a communication-type navigation system is a system that uses a mobile telephone or other mobile terminal as a navigation terminal, and is also used as a navigation system for pedestrians. There are also navigation systems for pedestrians that preferably have a route guidance function that includes modes of transportation and have, in addition to searching and providing guidance for walking routes, a function for collecting operation timetable data and routes for modes of transportation in a route search server, and for searching and providing guidance for routes (boarding-candidate train) from a desired departure station to a desired destination station in addition to searching and providing guidance of walking route. There are also transportation guide systems for receiving and displaying routes for modes of transportation, timetables, boardable trains, and other distributed information from an information distribution server that does not provide route searches for walking routes.

Route search devices and route search methods used in general navigation devices and communication navigation systems are disclosed in, e.g., Patent Document 1 (Japanese Laid-open Patent Application No. 2001-165681). This navigation system is configured so as to send departure point and destination information from a mobile navigation terminal to an information distribution server, search from road network and transportation network data in the information distribution server, and provide guidance for a route that matches the search conditions. Used as one search condition for a route search is movement means from a departure point to a destination, examples of which include walking, automobile, railroad, and other modes of transportation in combination with walking.

The information distribution server uses the positions of connecting points and curve points of roads (routes) in a map data as connection points as nodes, and the route that connects the nodes as links, and is provided with cost information (distance, time required) of all the links as a database. The information distribution server references the database, and is capable of sequentially searching for links that reach from the node of the departure point to the node of the destination, following nodes and links that minimize the cost information of links, and providing guidance to the mobile navigation terminal about the shortest route. A method referred to as the label determination method or the Dijkstra method is used as the route search technique. A route search method that uses the Dijkstra method is disclosed in Patent Document 1 noted below.

Route search systems for searching routes using transportation systems are provided with an operation timetable database in which operation timetable data of transportation systems have been organized into a database on the basis of departure time, departure point, destination, arrival time, and other route search conditions specified by the user; and are provided with data in which the transportation network has been organized into a database on the basis of the above. The route search systems are configured to reference these databases, connect a departure point and a destination that includes transit changes (transfers), sequentially follow usable modes of transportation (individual trains and shuttle buses) as a route, and present one or a plurality of candidates for route guidance (departure station, destination station, course, train, and other modes of transportation) that matches the route search conditions. Route search conditions that can be specified commonly further include required time, number of transit changes, fares, and other conditions.

A user operates a mobile terminal, inputs a category of store or event and desired region to be searched, and requests the search to be provided with information about stores and events. The server searches for a store or event that corresponds to the specified category and that is present in the region, and the information is transmitted to the map display terminal. In the provision of the timetable, the timetable of the route is presented on the screen of the display device of the mobile terminal when the user operates the mobile terminal and specifies a route. In the transfer guidance, the user specifies a departure point and a destination point, whereby a recommended route is presented.

It is also possible to connect a PC, a mobile telephone, or another terminal device to a map server on the Internet; to input a desired spot, facility and store address, name, telephone number, or the like to download map data in a predetermined range that includes the spot and the position of the facility and store; and to display a map image on the display device.

The map data for displaying a map image in a communicative-type navigation system is commonly composed of vector map data rather than bitmap data (raster map data) for reducing the amount of data during communication. The vector map data is composed of polygon data for displaying roads included in a map in mesh units in a state approximate to natural geographical features, and road data in which road links are expressed as vectors. The road data expressed as vectors are used when a guidance route or a route history are drawn on the map image. The present position of the map display device is drawn on the route or road data that is searched in route guidance. The present position is calculated by a satellite navigation method using a GPS receiver disposed in the map display device.

Map data and route search network data provided to a common routing guide system is data related to a region (referred to herein as service area) to which the system provides routing guide service. For example, an ordinary routing guide system is designed for domestic service in a certain country, or is designed for service in a specific region in a certain country.

In such a case, there is no problem in a route search or route guidance as long as the departure point and destination are within the service area of a certain routing guide system. However, the total route cannot be searched or guidance provided from a departure point to a destination in the case that the departure point is within a certain country and the destination is located in another country. The reason for this is that the route that the routing guide system on the departure point side can search and provide guidance for has a range that lies within the country of the departure point side, and is not provided with map data and route search network data of the other country of the destination side.

In an onboard navigation device or the like, map data and route search network data of a specific region are stored in the onboard navigation device; and when a spot outside of the area is set as the destination, the route search depends on a server provided with map data and route search network data of the entire country that includes the other region. Alternatively, a method may used in which a route search is enabled on the navigation device side by downloading the map data and route search network data of the lacking regions.

For example, such a routing guide device has been disclosed in Patent Document 2 noted below (Japanese Laid-open Patent Application 2003-97960). The routing guide device uses starting points midway in the route as a plurality of candidates when route search from the departure point to the destination is carried out in a central facility. When the starting points are transmitted to the routing guide device, the routing guide device determines and transmits to the central facility the starting points for which guidance can be provided. The central facility carries out a route search from the departure point to the starting points, and the guide device is designed to carry out a route search from the starting points to the destination and provide an optimal route from the departure point to the destination.

A map display system is disclosed in Patent Document 3 (Japanese Laid-open Patent Application No. 2001-4392) noted below in which the present position or destination point information is transmitted as a map search condition from a mobile telephone as a terminal device to a map server, guidance information and map information are generated by a map server and distributed to the mobile telephone in accordance with search conditions, and the guidance information and map information are combined in the mobile telephone and displayed on the display device.

[Patent Reference 1]: Japanese Laid-open Patent Application No. 2001-165681 (FIGS. 1 and 2)
[Patent Reference 2]: Japanese Laid-open Patent Application No. 2003-97960 (FIGS. 1 and 2)
[Patent Reference 3]: Japanese Laid-open Patent Application No. 2001-4392 (FIGS. 4 and 6)

DISCLOSURE OF THE INVENTION

Problems the Invention is Intended to Solve

As described above, there are cases in which a routing guide service cannot be provided merely by using map data and route search network data that a certain routing guide system has in order to provide service. It is possible to provide the service needs of a user when the portion for which a route cannot be searched with one routing guide system can be searched in coordination which another routing guide system using the route search function of the other routing guide system, and the two routing guide systems can join together the guidance routes thus searched, such as in the routing guide system disclosed in Patent Document 2. This is not limited to route guidance and similarly applies to various information providing systems that provide map information.

However, depending on the country, there are cases in which it is prohibited to provide map data, road network and transportation network data to another country. Such restrictions are mainly in place for reasons related to national defense. The routing guide device disclosed in Patent Document 2 is a system based on the assumption that the map data contained in the routing guide device is map data of part of an area, and that the server contains map data of an entire country which includes the map data of the part of an area that the navigation device contains.

In a routing guide system or other information providing system having a function for providing map information, route search network data is created from the map data and the information of the road network and transportation network data and is kept in a database; and the map database containing map information must be retained in order to provide route guidance to a user. In the case that a routing guide system attempts to provide service across national boundaries, the map data, road network and transportation network data of the other country for which service is being attempted is required in addition to that of the home country. Therefore, in such a case, there is a problem in that the method of the routing guide device disclosed in Patent Document 2 cannot be used.

The applicant of the present invention has already submitted an International Patent Application for the invention described in PCT/JP2008/058182 for the purpose of providing a routing guide system in which routing guide systems provided with map data and route search network data for each country or region are coordinated and a series of routing guide services from a departure point to a destination in another country or region is smoothly handed off from system to system.

The invention described in the International Patent Application of PCT/JP2008/058182 provides coordination between a first and second routing guide system provided with map data and route search network data of each country and region, and is configured as shown in FIG. 12. In FIG. 12, the system A is a routing guide system in which area A is the service area, the system B is a routing guide system in which area B is the service area, and the routing guide systems of the system A and system B are systems having the same configuration.

The route search server 30A has only map data and route search network data that cover area A, and the route search server 30B has only map data and route search network data that cover area B. Therefore, the route search server 30A cannot carry out route searches that have a spot in area B as a departure point or destination, and the route search server 30B cannot carry out route searches that have a spot in area A as a departure point or destination.

In the case that the departure point and the destination in a route search request from the terminal device 20 are spots in different areas, the first routing guide system (A) extracts and sends to the second routing guide system (B) the candidate contact points within the boundary of a different area. The first and second routing guide systems search for an optimal candidate route from the departure point to a candidate contact point and an optimal candidate route from the candidate contact point to the destination, respectively, and provide required time and link data to the respective routing guide systems. The first or second routing guide system determines a recommended route having the shortest total required time among the candidate routes connected together at the candidate contact point, provides the recommended route data including the link data from the first routing guide system (A) to the terminal device, and requests route guidance to the first or second routing guide system on the basis of the recommended route data in accordance with area in which the terminal device is positioned.

In accordance with such a system configuration, it is possible to provide seamless route guidance from a departure point of the service area to a destination other than the service area by holding only contact point information between the service area and the area to which a destination area outside the service area belongs, sharing only the contact point information, and using the route guidance information of both areas in the case that route guidance is carried out to a location other than the service area for which map data or the like is unavailable. Therefore, it is possible to coordinate between routing guide systems provided with the map data and route search network data of respective countries or regions, and to smoothly hand off a series of routing guide systems from a departure point to a destination that straddle countries or regions from system to system.

However, there are numerous routing guide systems that have a specific country or region as a service area. In such a case, there is a problem in that the routing guide server A which has received a route search request must specify a routing guide system from among numerous routing guide systems that has the area containing a spot G as a service area in the case that the terminal device has transmitted to the routing guide server of the routing guide system A a route search request in which the departure point is a spot S within the area that a certain guide system A provides service and the destination is a spot G within the area that another routing guide system B provides service. Such problems similarly occur in the case that map information is provided to a terminal device. A map information providing system having map information that corresponds to the deficient map information must be specified in the case that the terminal device is positioned near the boundary of a service area that has map information and a service area that does not have map information.

In order to solve the problems described above, the route search servers of numerous routing guide systems must each have as data the information about the existence of other routing guide systems capable of coordination and information about the other routing guide systems, e.g., information about the areas to which other routing guide systems provide service, and information about the URL or the like of the server that provides the service. There is a new problem in that the data of all existing routing guide systems must be added and updated each time a new routing guide system is added to the systems being coordinated. There is a further problem in that in the case that the destination in a route search is in a different area outside of the service area, an area judgment function is required for specifying a routing guide system having the area to which the destination belongs as a service area, and the server of each routing guide system must have such a function.

The present inventors, as a result of thoroughgoing research to solve the problems described above, perfected the present invention having found that the problems described above can be solved by providing a server which mediates providing of map information (system which mediates providing of map information) that is connected to individual map information providing systems to be coordinated and that relays a map information request between map information providing servers of the map information providing system, and relays map information obtained in accordance with the request that map information be provided; and by bringing together the URL of the server that provides map information providing service, the contact point information at area boundaries with other map information providing systems, and other data in the server which mediates providing of map information.

In other words, in order to overcome these problems, a particular object of the present invention is to provide a system which mediates providing of map information, a server which mediates providing of map information, and a method for providing of map information in which a plurality of map information providing systems having predetermined areas as target service regions, and map information requested from the map information providing system of an adjacent service area can be provided to a terminal device via a mediating system that includes a server which mediates providing of map information.

Means for Solving the Abovementioned Problems

In order to solve the problems described above, a first aspect of the present invention is a system which mediates providing of map information comprising a plurality of map information providing systems and a server which mediates providing of map information and which is connected to the map information providing systems, the map information providing systems having a map information providing server in which a predetermined area is used as a service-providing area and which is provided with map data storage means for accumulating map data of the area, and a terminal device connected to the map information providing server and provided with display means for displaying a map image on the basis of map information, the system which mediates providing of map information characterized in that:

the terminal device comprises map acquisition judgment means for judging whether acquisition of map information is required, spot information calculation means for calculating spot position information for specifying map information to be acquired, and map synthesis means; and, in a case where the map acquisition judgment means has judged that map information must be acquired, transmits spot position information calculated by the map information calculation means to the server which mediates providing of the map information, via a first map information providing server in which the area in which the terminal device is positioned is used as the map information providing service area;

the server which mediates providing of map information comprises area judgment means for judging a service area which provides map information including the spot on the basis of the spot position information, and map information providing system judgment means for judging the map information providing system which will provide map information in the service area judged by the area judgment means; and requests providing of map information that includes the spot on the basis of the spot position information from a second map information providing server constituting the map information providing system judged by the map information providing system judgment means; and the terminal device synthesizes the map information held by the terminal device and the map information provided by the second map information providing server using the map synthesis means and displays the synthesized map information on the display means.

The system which mediates providing of map information according to a second aspect is the system which mediates providing of map information according to the first aspect, characterized in that the terminal device is provided with present position acquisition means for acquiring a present position, and displays a map image including the present position on the basis of the present position acquired by the present position acquisition means; the map acquisition judgment means judges whether the acquisition of map information is required on the basis of whether there exists a portion where the map image is not displayed on the display screen of the display means; and the spot information calculation means determines a specific spot included in the undisplayed map image, and calculates the position information of the spot.

The system which mediates providing of map information according to a third aspect is the system which mediates providing of map information according to the second aspect, characterized in that the spot information calculation means calculates, on the basis of a display area of a deficient portion of the map image not displayed on the display screen of the display means, a predetermined coordinate position of the deficient portion; determines a specific spot on the map information on the basis of the coordinate position; and calculates the position information on the map information of the specific spot.

The system which mediates providing of map information according to a fourth aspect is the system which mediates providing of map information according to the second aspect, characterized in that the map acquisition judgment means judges whether acquisition of map information is required on the basis of whether there is a portion in which the map image is not displayed on the display screen of the display means; and the spot information calculation means extracts, on the basis of the map information displayed on the display means, contact point information for connecting the map image displayed on the display screen and the map information that includes the map image not displayed on the display screen, specifies a spot that does not have vector information of a link that corresponds to the contact point, and calculates position information of the spot on the map information.

The system which mediates providing of map information according to a fifth aspect is the system which mediates providing of map information according any of the first to fourth aspects, characterized in that the server which mediates providing of map information comprises user information storage means for storing service usage information that corresponds to user information received from each of the map information providing servers, and distribution permission judgment means for judging whether to permit providing of map information in accordance with the user information stored in the user information storage means, wherein the terminal device is provided with user identification information storage means, and transmits user identification information stored in the user identification information storage means together with spot information calculated by the spot information calculation means to the server which mediates providing of map information via the first map information providing server in which the area in which the terminal device is positioned is used as the map information providing service area;

the server which mediates providing of map information judges whether there is distribution permission in the second map information providing server on the basis of the user information when the map information including the spot is requested on the basis of the spot position information from the second map information providing server constituting the map information providing system judged by the map information providing system judgment means on the basis of the user information and spot position information received from the first map information providing server, transmits the spot position information to the second map information providing server in the case that there is distribution permission, and transmits information indicating that there is no distribution permission to the first map information distribution server in the case that there is no distribution permission.

A sixth aspect of the present invention is a server which mediates providing of map information connected to a plurality of map information providing systems, said plurality of map information providing systems having a map information providing server in which a predetermined area is used as a service-providing area and which is provided with map data storage means in which map data of the area is accumulated, and a terminal device connected to the map information providing server and provided with display means for displaying a map image on the basis of map information, the server which mediates providing of map information characterized in that:

the terminal device comprises map acquisition judgment means for judging whether map information needs to be acquired, spot information calculation means for calculating spot position information for specifying map information to be acquired, and map synthesis means; and, in a case where the map acquisition judgment means has judged that map information must be acquired, transmits spot position information calculated by the map information calculation means to the server which mediates providing of the map information, via a first map information providing server in which the area in which the terminal device is positioned is used as the map information providing service area;

the server which mediates providing of map information comprises area judgment means for judging a service area which provides map information including the spot on the basis of the spot position information, and map information providing system judgment means for judging the map information providing system which will provide map information in the service area judged by the area judgment means; and requests providing of map information that includes the spot on the basis of the spot position information from a second map information providing server constituting the map information providing system judged by the map information providing system judgment means; and the terminal device synthesizes the map information held by the terminal device and the map information provided by the second map information providing server using the map synthesis means; and displays the synthesized map information on the display means.

The server which mediates providing of map information according to a seventh aspect is the server which mediates providing of map information according to the sixth aspect, characterized in that the terminal device is provided with present position acquisition means for acquiring a present position, and displays on the display means a map image including the present position on the basis of the present position acquired by the present position acquisition means; the map acquisition judgment means judges whether acquisition of map information is required on the basis of whether there exists a portion where the map image is not displayed on the display screen of the display means; and the spot information calculation means determines a specific spot included in the undisplayed map image, and calculates the position information of the spot.

The server which mediates providing of map information according to an eighth aspect is the server which mediates providing of map information according to the seventh aspect, characterized in that the spot information calculation means calculates, on the basis of a display area of a deficient portion of the map image not displayed on the display screen of the display means, a predetermined coordinate position of the deficient portion, determines a specific spot on the map information on the basis of the coordinate position, and calculates the position information on the map information of the specific spot.

The server which mediates providing of map information according to a ninth aspect is the server which mediates providing of map information according to the seventh aspect, characterized in that the map acquisition judgment means judges whether acquisition of map information is required on the basis of whether there exists a portion where the map image is not displayed on the display screen of the display means; and the spot information calculation means extracts, on the basis of the map information displayed on the display means, contact point information for connecting the map image displayed on the display screen and the map information that includes the map image not displayed on the display screen, specifies a spot that does not have vector information of a link that corresponds to the contact point, and calculates position information of the spot on the map information.

The server which mediates providing of map information according to a tenth aspect is the server which mediates providing of map information according to any of the sixth to ninth aspects, characterized in that the server which mediates providing of map information comprises user information storage means for storing service usage information that corresponds to user information received from each of the map information providing servers, and distribution permission judgment means for judging whether to permit providing of map information in accordance with the user information stored in the user information storage means, wherein the terminal device is provided with user identification information storage means, and transmits user identification information stored in the user identification information storage means together with spot information calculated by the spot information calculation means to the server which mediates providing of map information via the first map information providing server in which the area in which the terminal device is positioned is used as the map information providing service area;

the server which mediates providing of map information judges whether there is distribution permission in the second map information providing server on the basis of the user information when provision of the map information including the spot is requested on the basis of the spot position information from the second map information providing server constituting the map information providing system judged by the map information providing system judgment means on the basis of the user information and spot position information received from the first map information providing server, transmits the spot position information to the second map information providing server in the case that there is distribution permission, and transmits information indicating that there is no distribution permission to the first map information distribution server in the case that there is no distribution permission.

An eleventh aspect of the present invention is a method for providing map information in a system which mediates providing of map information comprising a plurality of map information providing systems and a server which mediates providing of map information and which is connected to the map information providing systems, the map information providing systems having a map information providing server in which a predetermined area is used as a service-providing area and which is provided with map data storage means in which map data of the area is accumulated, and a terminal device connected to the map information providing server and provided with display means for displaying a map image on the basis of map information, the method for providing map information characterized in that:

the terminal device is provided with map acquisition judgment means for judging whether acquisition of map information is required, spot information calculation means for calculating spot position information for specifying map information to be acquired, and map synthesis means; and, in a case where the map acquisition judgment means has judged that map information must be acquired, has a step of transmitting spot position information calculated by the map information calculation means to the server which mediates providing of the map information, via a first map information providing server in which the area in which the terminal device is positioned is used as the map information providing service area;

the server which mediates providing of map information is provided with area judgment means for judging a service area which provides map information including the spot on the basis of the spot position information, and map information providing system judgment means for judging the map information providing system which will provide map information in the service area judged by the area judgment means; and has a step of requesting providing of map information that includes the spot on the basis of the spot position information from a second map information providing server constituting the map information providing system judged by the map information providing system judgment means; and the terminal device has a step of synthesizing the map information held by the terminal device and the map information provided by the second map information providing server using the map synthesis means and displaying the synthesized map information on the display means.

The method for providing map information according to a twelfth aspect is the method for providing map information according to the eleventh aspect, characterized in that the terminal device is provided with present position acquisition means for acquiring a present position, and has a step of having a map image including the present position displayed on the display means on the basis of the present position acquired by the present position acquisition means; a step of having the map acquisition judgment means judge whether acquisition of map information is required on the basis of whether there exists a portion where the map image is not displayed on the display screen of the display means; and a step of having the spot information calculation means determine a specific spot included in the undisplayed map image, and calculating the position information of the spot.

The method for providing map information according to a thirteenth aspect is the method for providing map information according to the twelfth aspect, characterized in comprising a step of having the spot information calculation means calculate, on the basis of a display area of a deficient portion of the map image not displayed on the display screen of the display means, a predetermined coordinate position of the deficient portion; and a step of determining a specific spot on the map information on the basis of the coordinate position, and calculating the position information on the map information of the specific spot.

The method for providing map information according to a fourteenth aspect is the method for providing map information according to the twelfth aspect, characterized in comprising a step of having the map acquisition judgment means judge whether acquisition of map information is required on the basis of whether there exists a portion where the map image is not displayed on the display screen of the display means; and a step of having the spot information calculation means extract, on the basis of the map information displayed on the display means, contact point information for connecting the map image displayed on the display screen and the map information that includes the map image not displayed on the display screen, specify a spot that does not have vector information of a link that corresponds to the contact point, and calculate position information of the spot on the map information.

The method for providing map information according to a fifteenth aspect is the method for providing map information according to any of the eleventh to fourteenth aspects, characterized in that:

the server which mediates providing of map information is provided with user information storage means for storing service usage information that corresponds to user information received from each of the map information providing servers, and distribution permission judgment means for judging whether to permit providing of map information in accordance with the user information stored in the user information storage means;

the terminal device is provided with user identification information storage means, and has a step of transmitting user identification information stored in the user identification information storage means together with spot information calculated by the spot information calculation means to the server which mediates providing of map information via the first map information providing server in which the area in which the terminal device is positioned is used as the map information providing service area;

the server which mediates providing of map information has a step of receiving, on the basis of the spot position information, a request to provide the map information including the spot to the second map information providing server, which constitutes the map information providing system judged by the map information providing system judgment means on the basis of the user information and spot position information received from the first map information providing server, whereupon a judgment is made as to whether there is distribution permission in the second map information providing server on the basis of the user information; a step of transmitting the spot position information to the second map information providing server in the case that there is distribution permission; and a step of transmitting information indicating that there is no distribution permission to the first map information distribution server in the case that there is no distribution permission.

A sixteenth aspect of the present invention is a terminal device in a system which mediates providing of map information comprising a plurality of map information providing systems and a server which mediates providing of map information and which is connected to the map information providing systems, the map information providing systems having a map information providing server in which a predetermined area is used as a service-providing area and which is provided with map data storage means in which map data of the area is accumulated, and a terminal device connected to the map information providing server and provided with display means for displaying a map image on the basis of map information, the terminal device characterized in that:

the server which mediates providing of map information comprises area judgment means for judging a service area which provides map information including the spot on the basis of spot position information calculated by the terminal device, and map information providing system judgment means for judging the map information providing system which will provide map information in the service area judged by the area judgment means; and requests providing of map information that includes the spot on the basis of the spot position information from a second map information providing server constituting the map information providing system judged by the map information providing system judgment means; and the terminal device comprises map acquisition judgment means for judging whether acquisition of map information is required, spot information calculation means for calculating spot position information for specifying map information to be acquired, and map synthesis means; and, in a case where the map acquisition judgment means has judged that map information must be acquired, the terminal device transmits spot position information calculated by the map information calculation means to the server which mediates providing of the map information, via a first map information providing server in which the area in which the terminal device is positioned is used as the map information providing service area; synthesizes the map information held by the terminal device and the map information provided by the second map information providing server using the map synthesis means; and displays the synthesized map information on the display means.

A seventeenth aspect of the present invention is the terminal device according to the sixteenth aspect, characterized in that the terminal device is provided with present position acquisition means for acquiring a present position, and displays a map image including the present position on the display means on the basis of the present position acquired by the present position acquisition means; the map acquisition judgment means judges whether acquisition of map information is required on the basis of whether there exists a portion where the map image is not displayed on the display screen of the display means; and the spot information calculation means determines a specific spot included in the undisplayed map image, and calculates the position information of the spot.

An eighteenth aspect of the present invention is the terminal device according to the seventeenth aspect, characterized in that the spot information calculation means calculates, on the basis of a display area of a deficient portion of the map image not displayed on the display screen of the display means, a predetermined coordinate position of the deficient portion; determines a specific spot on the map information on the basis of the coordinate position; and calculates the position information on the map information of the specific spot.

A nineteenth aspect of the present invention is the terminal device according to the seventeenth aspect, characterized in that the map acquisition judgment means judges whether acquisition of map information is required on the basis of whether there exists a portion where the map image is not displayed on the display screen of the display means; and the spot information calculation means extracts, on the basis of the map information displayed on the display means, contact point information for connecting the map image displayed on the display screen and the map information that includes the map image not displayed on the display screen, specifies a spot that does not have vector information of a link that corresponds to the contact point, and calculates position information of the spot on the map information.

Effects of the Invention

In the first aspect, the terminal device comprises map acquisition judgment means for judging whether acquisition of map information is required, spot information calculation means for calculating spot position information for specifying map information to be acquired, and map synthesis means; and, in a case where the map acquisition judgment means has judged that map information must be acquired, transmits spot position information calculated by the map information calculation means to the server which mediates providing of the map information, via a first map information providing server in which the area in which the terminal device is positioned is used as the map information providing service area;

the server which mediates providing of map information comprises area judgment means for judging a service area which provides map information including the spot on the basis of the spot position information, and map information providing system judgment means for judging the map information providing system which will provide map information in the service area judged by the area judgment means; and requests providing of map information that includes the spot on the basis of the spot position information from a second map information providing server constituting the map information providing system judged by the map information providing system judgment means; and the terminal device synthesizes the map information held by the terminal device and the map information provided by the second map information providing server using the map synthesis means and displays the synthesized map information on the display means.

In accordance with this configuration, the terminal device specifies the spot of a deficient portion, calculates the map information of the spot, and requests a map from the server which mediates providing of map information in the case that the map information is insufficient and there is a portion of the map image that cannot be displayed when the terminal device has moved near the boundary of an adjacent area. The terminal device can thereby obtain the applicable map information from the server which mediates providing of map information that provides the map information of the adjacent area, and can synthesize and display the map information already in its possession and the map information acquired via the server which mediates providing of map information.

The second aspect is the system which mediates providing of map information according to the first aspect, wherein the terminal device is provided with present position acquisition means for acquiring a present position, and displays a map image including the present position on the basis of the present position acquired by the present position acquisition means; the map acquisition judgment means judges whether the acquisition of map information is required on the basis of whether there exists a portion where the map image is not displayed on the display screen of the display means; and the spot information calculation means determines a specific spot included in the undisplayed map image, and calculates the position information of the spot.

In accordance with this configuration, the terminal device can readily determine whether it is necessary to acquire map information of an adjacent area on the basis of the map image displayed on the display means, and can readily specify the spot of a deficient portion and calculate the position information of the spot.

The third aspect is the system which mediates providing of map information according to the second aspect, wherein the spot information calculation means calculates, on the basis of a display area of a deficient portion of the map image not displayed on the display screen of the display means, a predetermined coordinate position of the deficient portion; determines a specific spot on the map information on the basis of the coordinate position; and calculates the position information on the map information of the specific spot.

In accordance with this configuration, the terminal device can readily determine whether it is necessary to acquire map information of an adjacent area on the basis of the map image displayed on the display means, and can readily specify the spot of a deficient portion on the basis of the coordinates of the display screen and calculate the position information of the spot.

The fourth aspect is the system which mediates providing of map information according to the second aspect, wherein the map acquisition judgment means judges whether acquisition of map information is required on the basis of whether there is a portion in which the map image is not displayed on the display screen of the display means; and the spot information calculation means extracts, on the basis of the map information displayed on the display means, contact point information for connecting the map image displayed on the display screen and the map information that includes the map image not displayed on the display screen, specifies a spot that does not have vector information of a link that corresponds to the contact point, and calculates position information of the spot on the map information.

In accordance with this configuration, the terminal device can readily determine whether it is necessary to acquire map information of an adjacent area on the basis of the map image displayed on the display means, and can readily specify the spot of a deficient portion using contact point information between different areas and calculate the position information of the spot.

The fifth aspect is the system which mediates providing of map information according to any of the first to fourth aspects, wherein the server which mediates providing of map information comprises user information storage means for storing service usage information that corresponds to user information received from each of the map information providing servers, and distribution permission judgment means for judging whether to permit providing of map information in accordance with the user information stored in the user information storage means; the terminal device is provided with user identification information storage means, and transmits user identification information stored in the user identification information storage means together with spot information calculated by the spot information calculation means to the server which mediates providing of map information via the first map information providing server in which the area in which the terminal device is positioned is used as the map information providing service area; and the server which mediates providing of map information judges whether there is distribution permission in the second map information providing server on the basis of the user information when the map information including the spot is requested on the basis of the spot position information from the second map information providing server constituting the map information providing system judged by the map information providing system judgment means on the basis of the user information and spot position information received from the first map information providing server, transmits the spot position information to the second map information providing server in the case that there is distribution permission, and transmits information indicating that there is no distribution permission to the first map information distribution server in the case that there is no distribution permission.

In accordance with this configuration, it is determined whether the terminal device (user) has performed user registration or member registration in order to receive service from the map information providing server, and map information can be provided to the terminal device (user) for which service for providing map information has been permitted.

In the sixth to tenth aspects and in the eleventh to fifteenth aspects, it is possible to provide a server which mediates providing of map information and a method for providing map information in the system which mediates providing of map information according to the first to fifth aspects. In the sixteenth to nineteenth aspects, it is possible to provide a terminal device in the system which mediates providing of map information according to the first to fourth aspects.

BRIEF DESCRIPTION OF THE DRAWINGS

FIG. 2 is a conceptual view of a map image displayed when the terminal device is positioned in the vicinity of an area boundary, wherein

Figure 1:
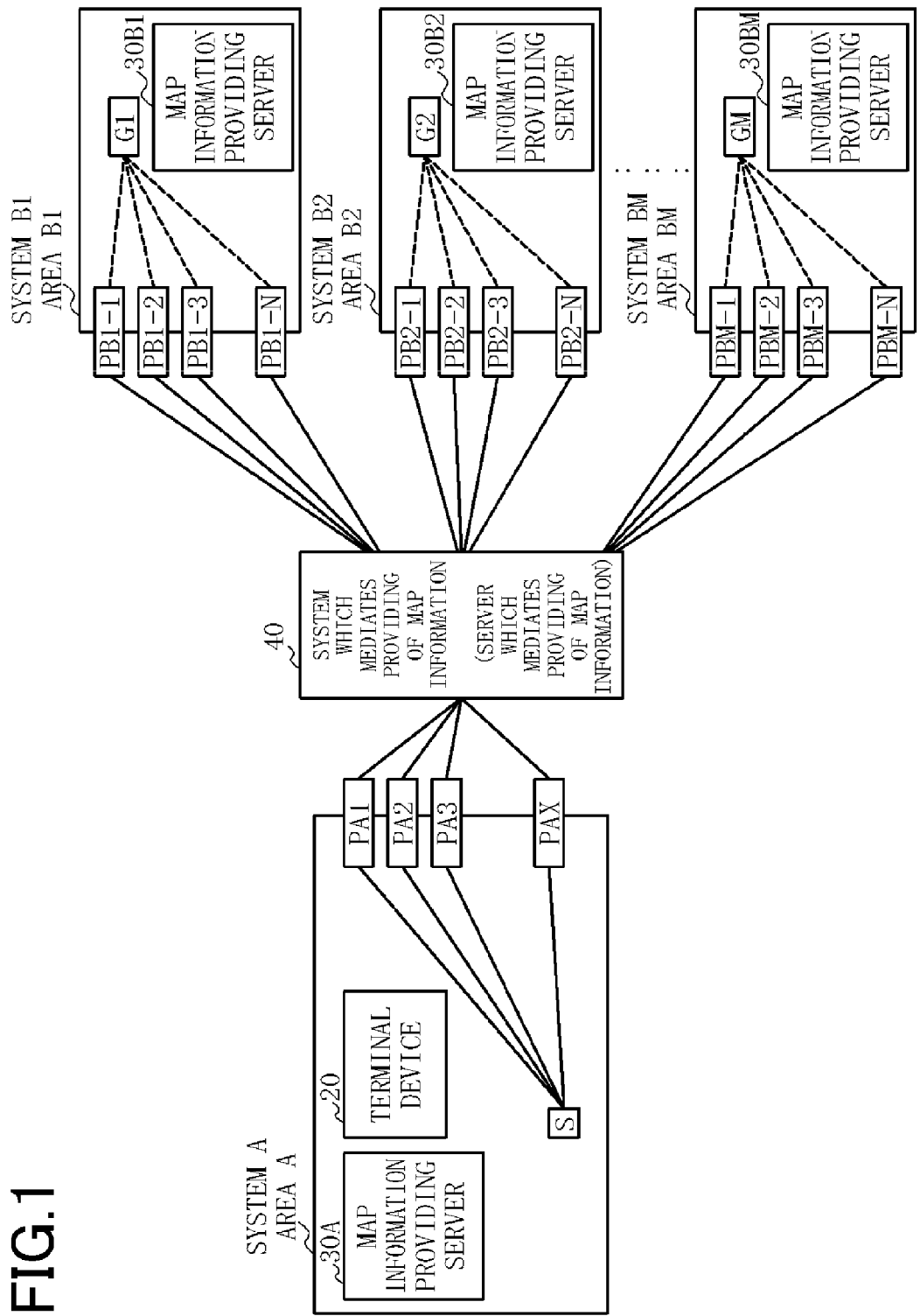
FIG. 1 is a system configuration diagram showing the configuration of a system which mediates providing of map information in which the server which mediates providing of map information of an example of the present invention is used.

KEY TO SYMBOLS 20 terminal device
30A map information providing server
30B1 to 30BM map information providing servers
40 server which mediates providing of map information (system which mediates providing of map information)
21 control means
23 present position acquiring means
24 operation input means
25 map acquisition judgment means
26 display means
27 spot information calculation means
28 map synthesis means
29 communication means

BEST MODE FOR CARRYING OUT THE INVENTION

Specific examples of the present invention are described in detail below using working examples and the drawings. However, the examples described below are used for illustrating a system which mediates providing of map information and a server which mediates providing of map information for implementing the technical concepts of the present invention, there being no intent to limit the present invention to the system which mediates providing of map information and the server which mediates providing of map information described below. Equivalent application can also be made to the system which mediates providing of map information and the server which mediates providing of map information of other embodiments included in the scope of the claims.

FIG. 1 is a system configuration diagram showing the configuration of a system which mediates providing of map information of the present invention is used. As shown in FIG. 1, the map information providing system is composed of a server 40 which mediates providing of map information connected via a network to numerous map information providing systems A and B1 to BM. The map information providing system A provides map information distribution service in area A, and the map information providing systems B1, B2 to BM provide map information distribution service to areas B1, B2 to BM, respectively.

For example, an area may be the service region of a single country, the service region of a plurality of countries, or the service region of a specific region in a single country. FIG. 1 illustrates a system in which the map information providing system is not limited to providing map information to the terminal device, but can also provide navigation service for searching and providing a plurality of candidate routes and an optimum route between two spots in accordance with route search conditions that include the departure point and destination set in the terminal device. To facilitate understanding in FIG. 1, the departure-side area of the user of a terminal device 20 is expressed as area A and the areas on the side selected as the destination are expressed areas B1, B2 to BM.

A map information providing server 30A included in the map information providing system A is provided to the area A in order to provide a map information and navigation service to area A, and map information providing servers 30B1, 30B2 to 30BM for providing map information distribution service and/or navigation service are similarly provided to the areas B1, B2 to BM. The terminal device 20 of the user is connected to a registered map information providing server 30A via the Internet, and can make desired route search requests.

Figure 11:
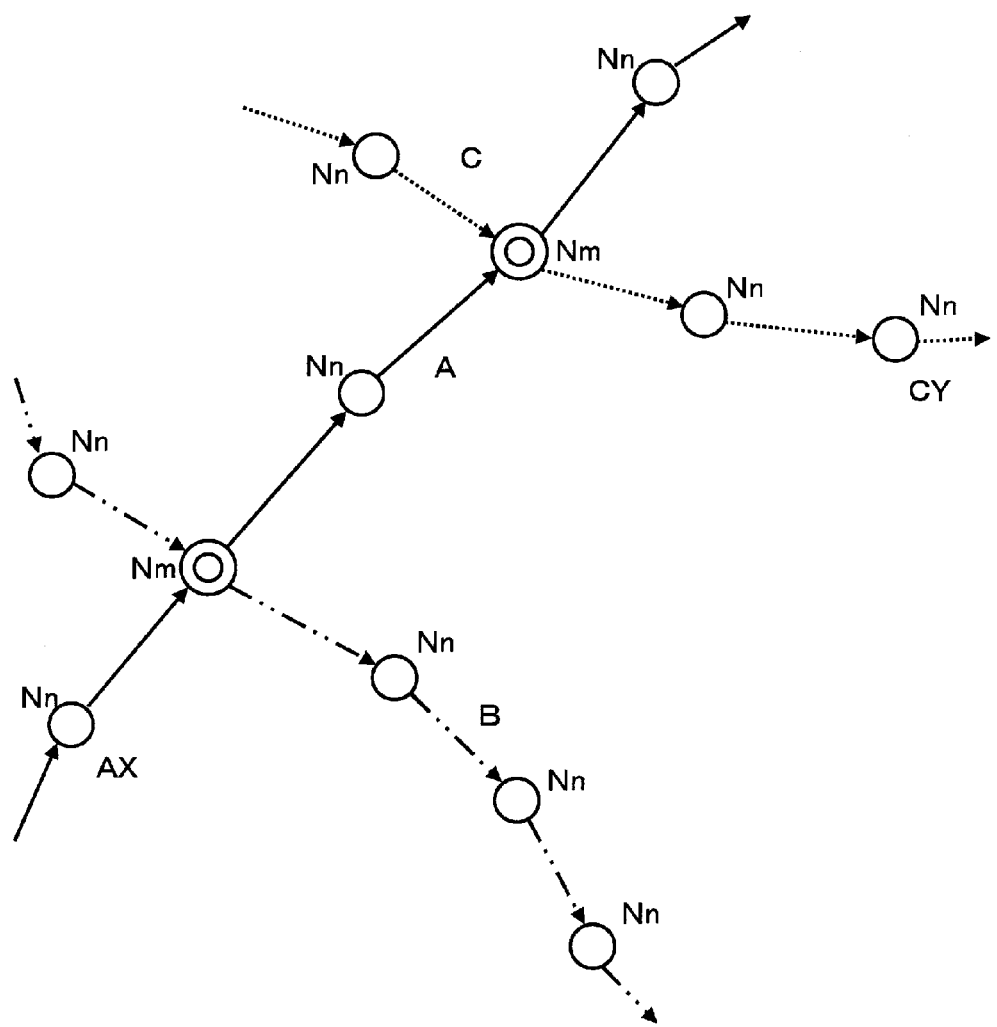
FIG. 11 is a schematic view showing the data concept of a road network.

The configuration of the map information providing server 30A and the map information providing servers 30B1 to 30BM are provided with the same basic configuration as the server shown in FIG. 11; and the map information providing server 30A and the map information providing servers 30B1 to 30BM have only route search network data and map data that cover the areas for which each server provides service. Therefore, the map information providing server 30A cannot perform route searches in which the spots in the areas B1 to BM are used as departure points and destinations, and the map information providing servers 30B1 to 30BM cannot perform route searches in which spots in the area A are used as departure points and destinations.

The map information providing server 30A and the map information providing server 30B1 to map information providing server 30BM are provided with information of candidate contact points PA1 to PAX, PB1-1 to PB1-N, ... PBM-1 to PBM-N on the basis of links of movement means that connect areas in which other map information providing systems provide service and areas other than the areas in which the servers provide service, and are provided with connection information in each candidate contact point. The candidate contact point information is information that shows airports, terminal stations, as well as the position information in which movement to a different area is possible, which includes the longitude, latitude, and the like of a national border on a main thoroughfare.

The information of the spot of the border as the candidate contact point may contain links that reliably reach a candidate contact point. Connection information in each candidate contact point is, e.g., an operating schedule for airplanes if the candidate contact point is connected by air routes, and an operating schedule for regular liners if the candidate contact point is connected sea routes. The systems connected via the server 40 which mediates providing of map information is not limited to a map information providing system, and various information-providing systems such as systems that provide point-of-interest (POI) information may be connected together.

As described above, each of the map information providing system A, B1, B2 to BM that provide routing guide service to individual areas is connected via a system which mediates providing of map information (server which mediates providing of map information) 40, and the server 40 which mediates providing of map information has candidate contact points and associated connection information that are held in the map information providing servers 30A, 30B1, 30B2 to 30BM of the areas A, B1, B2 to BM. The server 40 which mediates providing of map information is provided with area information, the URL of the map information providing servers 30A, 30B1 to 30BM, and other connection information in areas in which the map information providing systems A, B1, B2 to BM provide service; and has area determination means for determining which area a spot belongs to in terms of the service provided by the map information providing system when a destination or another desired spot is specified.

The terminal device 20 registered to a user in the map information providing system A can specify the present position and/or a desired spot, can specify specific POIs obtained from a POI search, and request distribution of map information that includes these spots from the map information providing server 30A.

In the case that distribution of map information that includes a spot specified in this manner has been requested, the map information providing server 30A distributes the map information to the terminal device 20 as long as the specified spot is within the area for which the map information providing system A provides service. As shall be apparent, the map information providing system A cannot provide the requested map information to the terminal device 20 when the specified spot is not within the area for which the map information providing system A provides service.

In the case that the map is moved while being displayed on the display means in the terminal device 20 and the service area boundary of an adjacent map information providing system is approached, the portion of the map image for which map information belonging to the adjacent service area is absent is not displayed on the display means and remains blank. FIG. 2 is a conceptual view of this situation, wherein FIG. 2(a) is a diagram showing a map image displayed on the display means of the terminal device 20 when the terminal device has approached from area M to the boundary between area M and area N, and FIG. 2(b) is a diagram showing the selection screen of a map download request displayed on the terminal device 20 when the map image such as that of FIG. 2(a) is displayed.

Figure 2A:
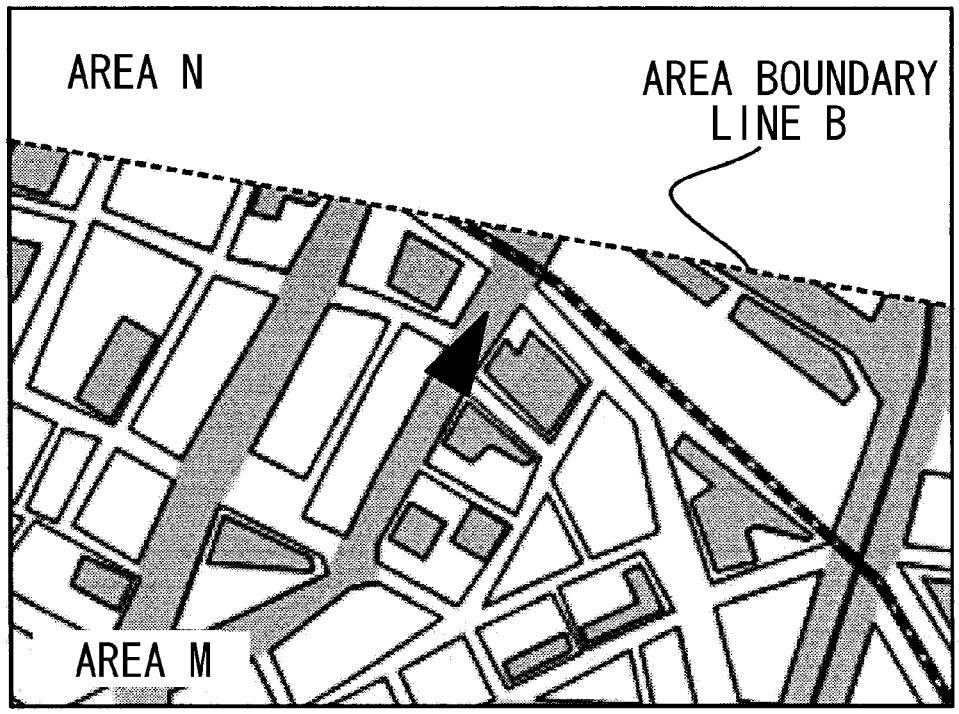
FIG. 2(a) is a diagram showing a map image displayed when the terminal device has approached from area M to the boundary between area M and area N.
Figure 2B:
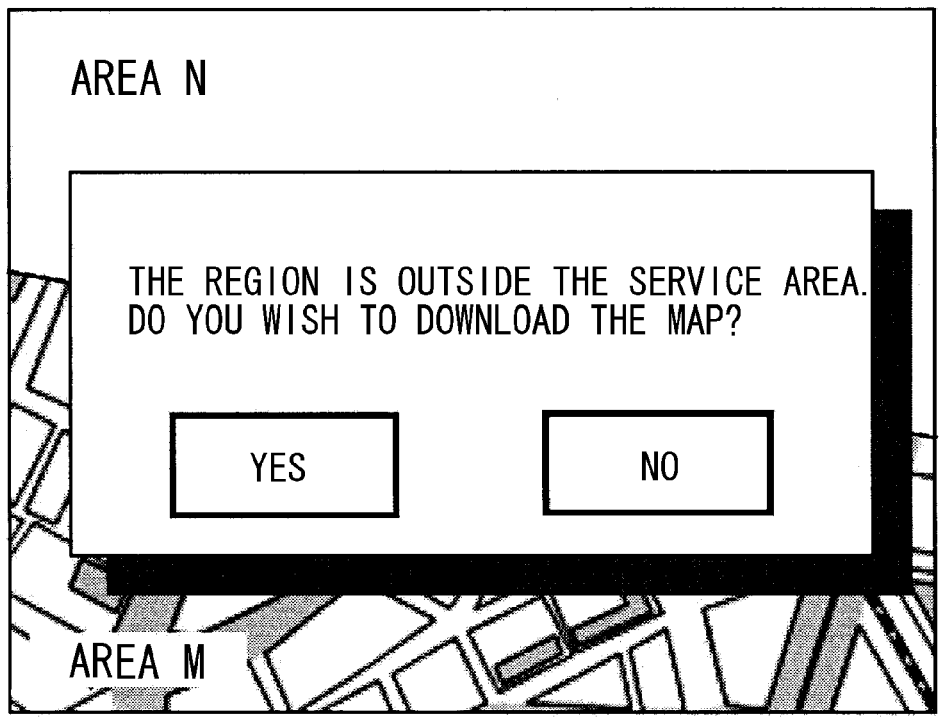
FIG. 2(b) is a diagram showing the selection screen of a map download request displayed on the terminal device when the map image of FIG. 2(a) is displayed.

When the terminal device 20 has approached the boundary between the area M and the area N from the area M, the map information providing server 30BM in which the area M is the service area does not have the map information of the area N, as shown in FIG. 2(a), and the terminal device 20 cannot acquire the map information of area N from the map information providing server 30BM. Accordingly, the map image displayed on the display means is merely a map image of the area M, the map image of the adjacent area N cannot be displayed, and the portion where the map image of the area N should be displayed is blank.

Thus, in the case that there is a blank portion in the map image displayed on the screen, the map information that corresponds to the blank portion must be acquired and displayed in order to display a map image in the blank portion as well. In view of this situation, a process described below is carried out in which a map download request selection screen that contains the message "The region is outside the service area. Do you wish to download the map?" is displayed, as shown in FIG. 2(b), the user of the terminal device 20 is made to select whether to acquire the map of the adjacent area N, and if the selection to download the map is made, the map information of the area N is provided to the terminal device 20 by the map information providing server 30BN in which the area N is the service area.

In other words, in the present embodiment, the terminal device 20 determines whether map information must be acquired in the case that a blank portion is present in the map image displayed on the screen. When it has been determined that a map image must be acquired, the map download request selection screen shown in FIG. 2(b) is displayed; and when map download has been selected, the terminal device 20 establishes a specific spot belonging to the blank portion and calculates the position (e.g., latitude, longitude) of the spot. The position information of this specific spot is referred in the present specification as the "spot position information." The method for establishing the specific spot and the method for calculating the spot position information are described in detail hereinbelow.

The terminal device 20 transmits the specific spot position information to the server 40 which mediates providing of map information when the specific spot position information has been calculated, and requests distribution of map information that contains the position of the specific spot. The request for distribution of map information is transmitted to the server 40 which mediates providing of map information via the map information providing server (e.g., the map information providing server 30M) from which the terminal device 20 had been up to that point receiving map information.

The server 40 which mediates providing of map information determines the map information providing system (e.g., system BN) that is providing map information service of the area that contains the specific spot (position of the specific spot) on the basis of the spot position information (request for distribution of map information) sent from the terminal device 20; receives the applicable map information from the map information providing server 30BN, and distributes the map information to the terminal device 20. Transmittance of the map information to the terminal device 20 may be direct transmittance from the server 40 which mediates providing of map information or may be transmittance to the terminal device 20 by way of the map information providing server (in the case described above, the map information providing server 30M) to which the terminal device 20 sent the spot position information. An example of the latter (the case of transmittance by way of the map information providing server 30M) is described below.

In the case that the service for providing map information is a pay service and user registration is required, the user of the terminal device 20 must be registered in the map information providing server 30BM and/or BN, or the like that will provide the map information, and must receive permission to receive distribution of map information from the map information providing server 30BM and/or the map information providing server 30BN. A preferred configuration in this case in one in which the server 40 which mediates providing of map information collects user registration information from the map information providing server 30A and the map information providing servers 30B1 to 30BM; the user registration information is transmitted to the map information providing server (e.g., map information providing server 30BM and/or map information providing server 30BN) to which the request of map information was made in the case that the user information is incorporated into a database and the request for distribution of map information is received from the terminal device 20; and the terminal device 20 receives notification of whether there is permission for distribution of map information to the terminal device 20 which made the request for map information, and the requested map information is distributed in the case that there is permission to distribute map information.

In accordance with this configuration, it is determined whether the terminal device 20 has performed user registration or member registration for receiving service from various map information providing servers, and it is possible to provide map information to the terminal device 20 which has permission to receive map information service.

In the case that the map information providing systems are provided with route search and route guidance functions, and a function for providing so-called navigation service, the terminal device 20 registered as a user in the map information providing system A sets route search conditions, transmits a route search request to the map information providing server 30A, an can receive route guidance in accordance with an optimal route, a candidate route, or another guidance route obtained as a result of the route search. Route search conditions include current position information acquired by GPS receiving means or other positioning means, or the departure point S, the destination G, and the departure time or arrival time specified by the user.

In the case that a route search request has been made from the terminal device 20 to the map information providing server 30A, the map information providing server 30A can reference the map data and route search network data, search for an optimal route from the departure point to the destination, and send the optimal route information to the terminal device 20 to provide route guidance as long as the departure point S and destination G for which route search conditions have been set by the terminal device 20 are within the area for which the map information providing system A provides service. This route guidance is the same as the function of an ordinary routing guide system and routing guide server.

The map information providing server 30A transmits a route search request to the server 40 which mediates providing of map information when the destination G set as a route search condition is not within the area for which the map information providing system A provides service as indicated by G1 to GM shown in FIG. 1. The server 40 which mediates providing of map information specifies a map information providing system in which the destinations G1 to GM are the service area among the destinations G1 to GM of the route search conditions received from the map information providing server 30A. For example, the map information providing system B1 and the map information providing server 30B1 are specified in the case that the destination is G1 within the area B1.

Figure 12:
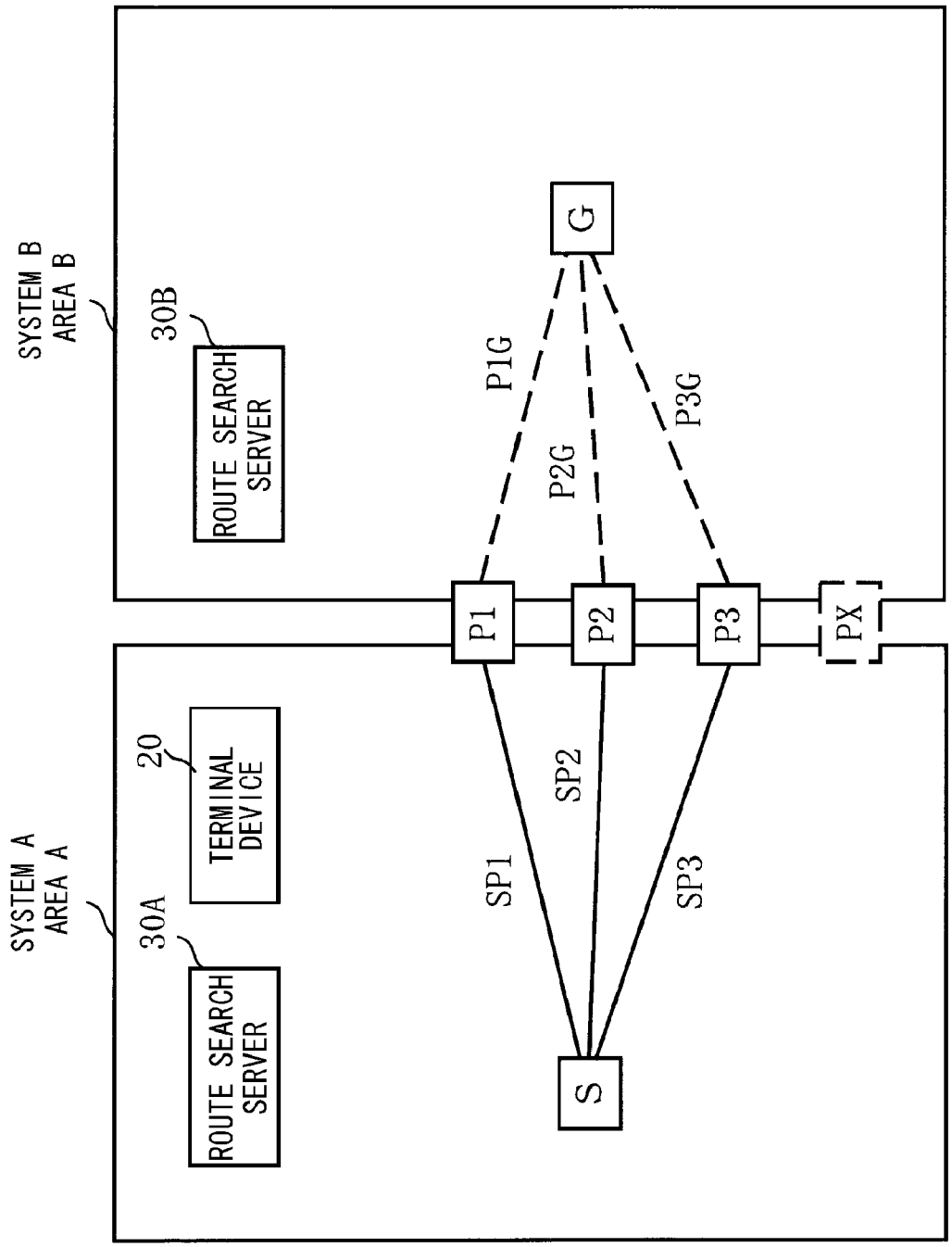
FIG. 12 is a system configuration diagram for describing the concept of routing guidance service in a plurality of map information providing systems in different service areas.

When the map information providing server 30B1 is specified, a recommended route from a certain area to another area is searched and the recommended route is provided to the terminal device 20, as described with reference to FIG. 12.

Figure 3:
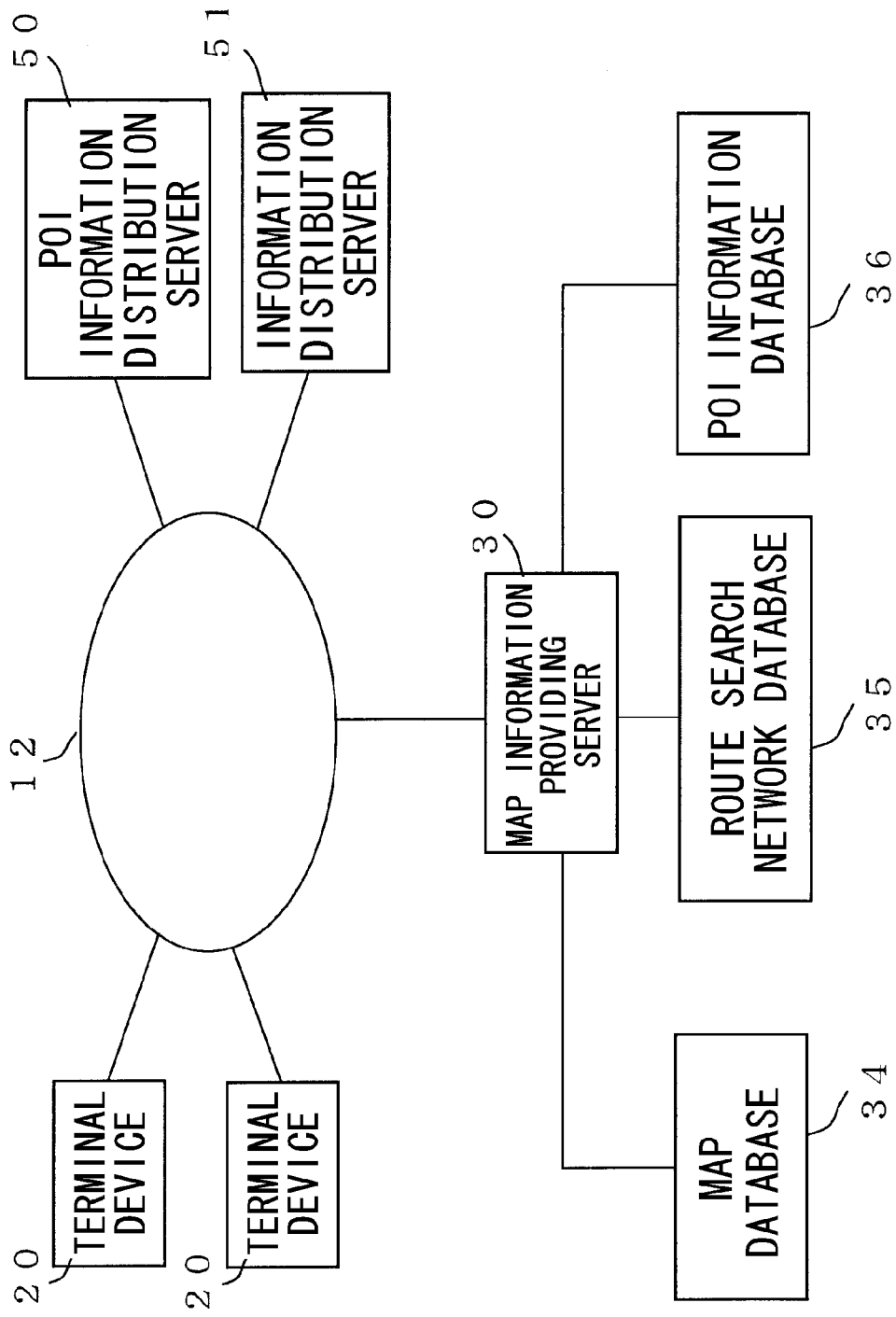
FIG. 3 is a system configuration diagram showing the concept of the map information providing system in which a specific area is used as a service area.

FIG. 3 is a system configuration diagram showing the configuration of the map information providing system A in FIG. 1. The configuration of other map information providing systems B1 to BM is the same configuration as FIG. 3. The map information providing system A is provided with a terminal device 20 and a map information providing server 30A that are connected via a network 12, as shown in FIG. 3. The map information providing system A is a system in which a specific country or region is the area in which service for route searches and route guidance is provided. Therefore, the map information providing server 30A has only route search network data and map data that covers the service area (area A).

The map information providing system A is provided with a POI information distribution server 50 that provides the location of Point of interest (POI), service content, and other detailed information belonging to various categories; an information distribution server 51 that provides other information such as music, images, and other content; and other servers. The map information providing server 30A can acquire required data from the POI information distribution server 50 and the information distribution server 51 by way of the network 12, and add the data to its own database. Also, a search request can similarly be sent to the POI information distribution server 50 and the information distribution server 51 to acquire a desired search result.

The map information providing system A of the present invention is not limited to the configuration described above, and it is also possible for the map information providing server 30A to have the functions of a map distribution server for distributing maps of POI locations in addition to a navigation service function. The terminal device 20 may also be a mobile telephone, PDA, music player, portable game machine, or another mobile device, or may be a mobile PC.

The map information providing server 30A is provided with a map database 34 and a route search network database 35, and when a route search request is received from the terminal device 20 and a route search is made with reference to the route search network database 35. The map information providing server 30A has a common navigation function for transmitting to the terminal device 20 the guidance route data of candidate routes and the optimal route obtained from the results of a route search. When a request is received from the terminal device 20 for map data for a desired spot or via a POI search, reference is made to the map database 34, and the applicable map data is read out and distributed to the terminal device 20.

The route search network database 35 is provided with road network data for searching for a route by walking or by automobile, and transportation network data for searching for a route for moving by railroad, aircraft, ship, bus, or another mode of transportation. The road network data expresses links that connect nodes together, the nodes being connecting points and intersections of roads; and the time required to move at a standard speed is associated with each link as a cost of the link.

The transportation network data expresses airports, seaports, and stations of routes of various modes of transportation as nodes using links that connect the nodes together, with the individual trains, aircraft, ships, buses, and other transportation means forming the links; and is composed of data in which the departure time from a node and the arrival time at a node are correlated based on operation timetables.

The route search conditions in which the departure point, destination, movement means (by walking, automobile, mode of transportation), and departure time and other time conditions are specified are set in the terminal device 20, and when the map information providing server 30A receives a route search request, the map information providing server 30A references network data of the route search network database 35, searches for an optimal route or a plurality of candidate routes that match the route search conditions, and returns the information of the routes to the terminal device 20. When a route is selected in the terminal device 20 and a route search request is made, the map data, the data of the selected route, or guidance data for providing guidance along the route is transmitted to the terminal device 20.

Figure 4:
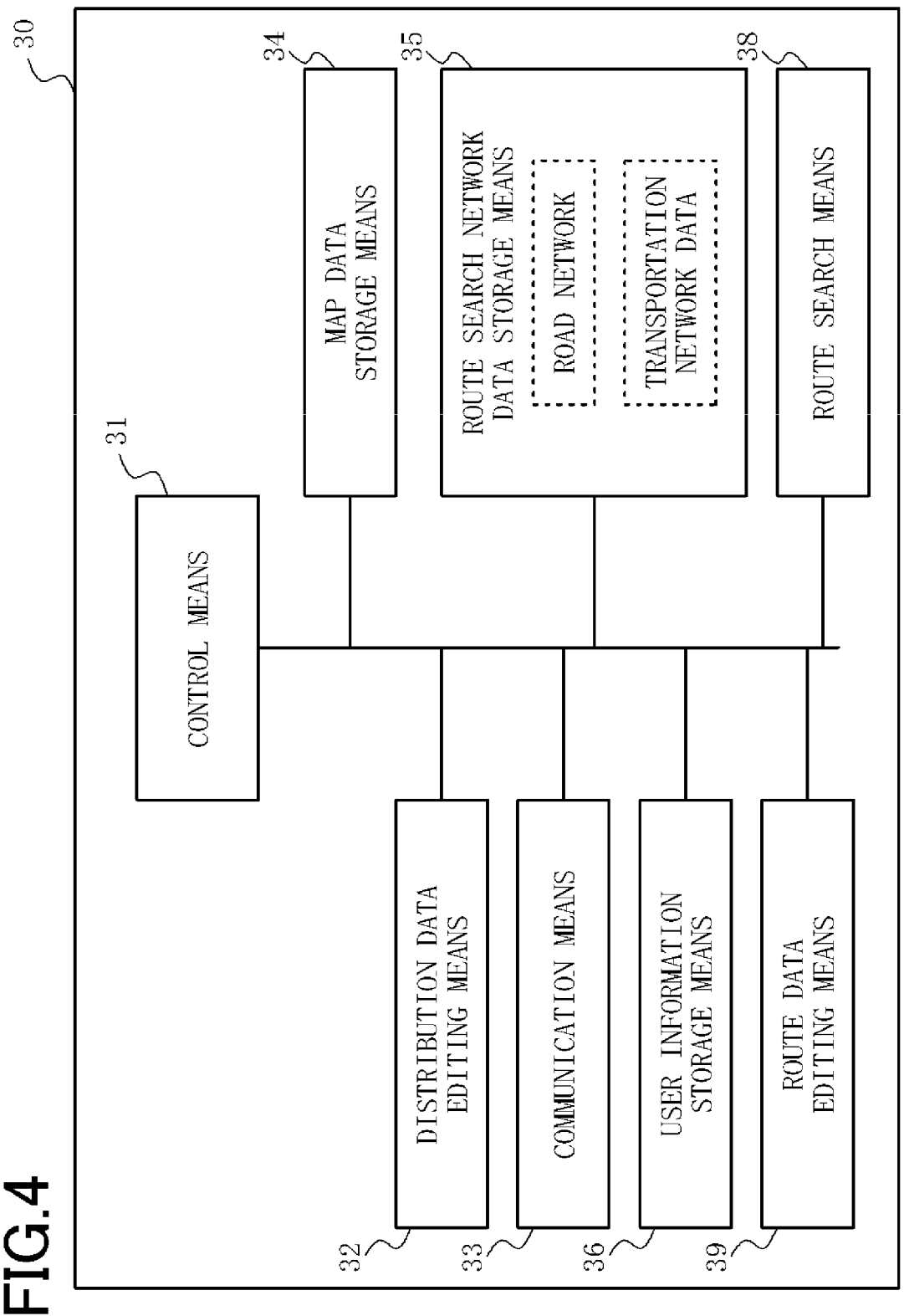
FIG. 4 is a block diagram showing the configuration of the map information providing system constituting a map information providing system in which a specific area is used as a service area.
Figure 5:
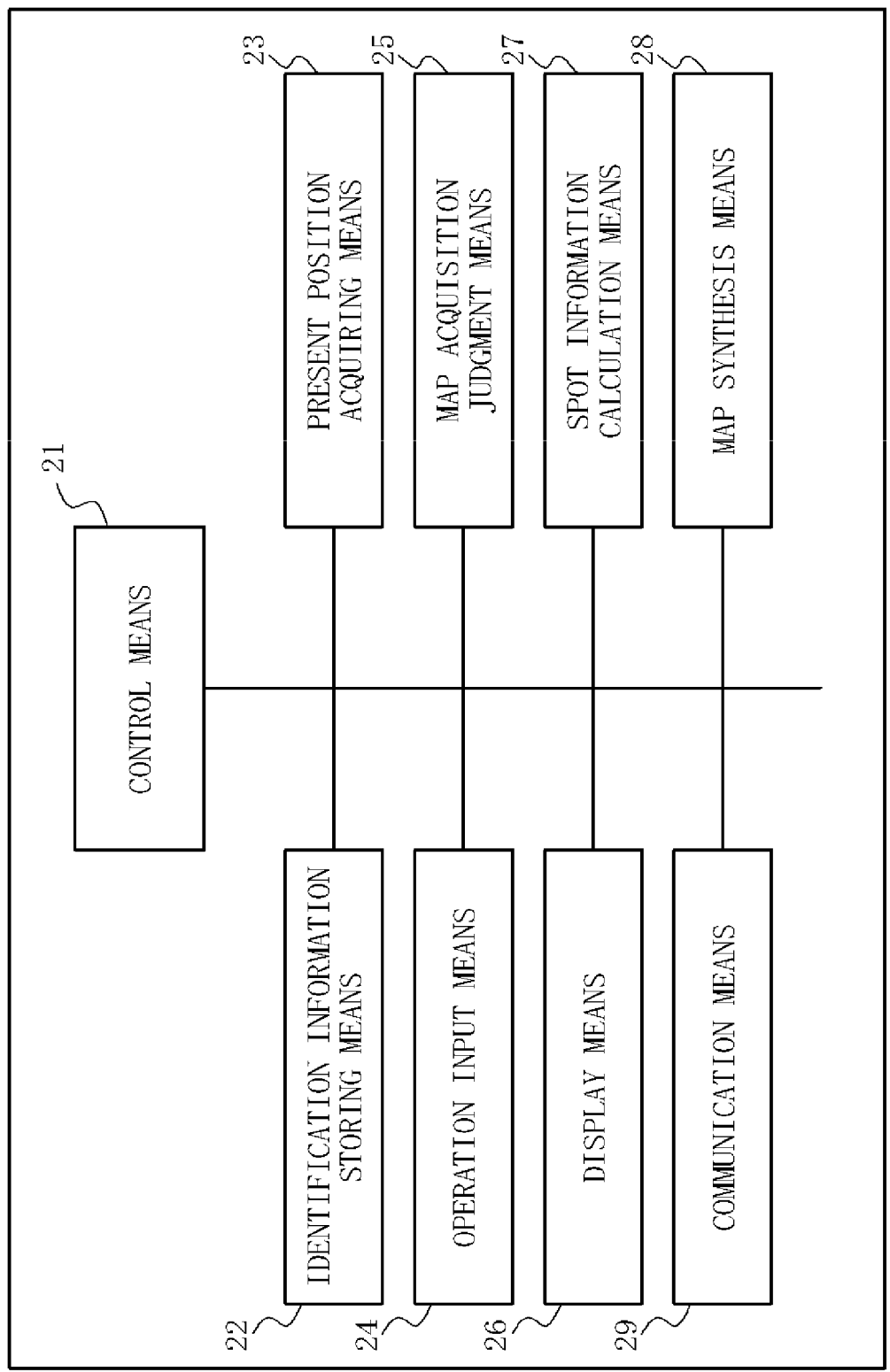
FIG. 5 is a block diagram showing the configuration of the terminal device constituting a map information providing system in which a specific area is used as a service area.

FIGS. 4 and 5 are block diagrams showing the configuration of the terminal device 20 and map information providing server 30A constituting a map information providing system A shown in FIG. 3. The map information providing servers 30B1 to 30BM constituting the other map information providing systems B1 to BM, and the configuration of the terminal device are the same as FIGS. 4 and 5. The map information providing server 30A is provided with control means 31, distribution data editing means 32, communication means 33, user information storage means 36, map data storage means 34, route search network data storage means 35 in which road network data and transportation network data are stored, route search means 38, and route data editing means 39, and has a navigation function for searching for a route by walking and/or using public transportation and providing guidance to the terminal device 20.

The control means 31 is a microprocessor having a RAM, a ROM, and a processor (not shown), and controls the operation of each part by using a control program stored in the ROM. The communication means 33 is a communication interface for transceiving communication data to and from the terminal device 20 or the like via a network. The route data editing means 39 edits the optimal route in the case that a route has been searched between different areas, as described with reference to FIG. 12. The distribution data editing means 32 is used for editing map information and route information to be transmitted to the terminal device 20.

When the present position of the terminal device 20 or a specific POI has been specified and a request to download map information has been received from the terminal device 20, the map data storage means 35 is referenced, the map information requested from the terminal device 20 is read and transmitted to the terminal device 20. The user information of the user of the terminal device 20 contracted or registered in order to receive service is stored in the user information storage means 34. The ID of the terminal device 20 and the user ID of the user of the terminal device 20 are included in the user information, and the user information is also sent to the server 40 which mediates providing of map information and registered in the user database of the server 40 which mediates providing of map information. In the case that a map information providing server 30 provides navigation service to the terminal device 20, the route search means 38 references the transportation network data and the road network data stored in the route search network data storage means 35 and searches for an optimal route in accordance with the route search conditions specified by the terminal device 20.

On the other hand, the terminal device 20 is a terminal that can receive navigation service, and is composed of control means 21, present position acquiring means 23, operation input means 24, map acquisition judgment means 25, display means 26, spot information calculation means 27, map synthesis means 28, communication means 29, and the like, as shown in FIG. 5. The operation input means 24 is composed of character input keys, selection keys, cursor keys for selecting setting items or the like on a menu screen displayed on the display screen, and other keys.

The ID of the terminal device 20, the user ID of the user of the terminal device 20, registration information in the servers registered for receiving map information and various other services are stored in identification information storage means 22. The identification information is sent to the server 40 which mediates providing of map information and stored in each terminal device 20 and is used for determining whether the terminal device 20 can receive the requested service from the map information providing server 30 when a map download request (described below) has been made.

The present position acquiring means 23 has a GPS receiver, receives GPS satellite signals transmitted from a plurality of GPS satellites, calculates the present position in latitude and longitude, and acquires the present position of the terminal device 20. The terminal device 20 displays on the display means 26 a map image having a predetermined size that includes the present position on the basis of the present position of the terminal device 20 acquired by the present position acquiring means 23. The map information is acquired from the map information providing server 30 (e.g., the map information providing server 30A in the case that the terminal device 20 is positioned in the area A).

When the terminal device 20 has approached the boundary between the area M and the area N from the area M, as shown in FIG. 2(a), the map information providing server BM having the area M as a service area does not have the map information of area N and the terminal device 20 cannot acquire the map information of the area N from the map information providing server 30BM. Accordingly, the map image displayed on the display means is merely a map image of the area M, the map image of the adjacent area N cannot be displayed, and the portion where the map image of the area N should be displayed is blank.

The map acquisition judgment means 25 determines whether there is a blank portion in the map image displayed on the display means 26, and determines whether map information must be acquired in the case that there is a blank portion in the map image. If it has been determined that a map image must be acquired, a map download request selection screen shown in FIG. 2(b) is displayed on the display means 26. When the user selects to download the map information, the spot information calculation means 27 establishes a specific spot in the blank portion of the display screen in which the map image is not displayed and calculates the position (e.g., latitude, longitude) of the spot. The position information of this specific spot is referred in the present specification as the "spot position information." The method for establishing the specific spot and the method for calculating the spot position information are described in detail hereinbelow.

The terminal device 20 transmits the specific spot position information to the server 40 which mediates providing of map information when the specific spot position information has been calculated, and requests distribution of map information that contains the position of the specific spot. The request for distribution of map information (specific spot position information) is transmitted to the server 40 which mediates providing of map information via the map information providing server (e.g., the map information providing server 30BM) from which the terminal device 20 had been up to that point receiving map information. The configuration and function of the server 40 which mediates providing of map information will be described later.

When map information is acquired in accordance with the map download request, the terminal device 20 synthesizes the map information using the map synthesis means 28 and displays the map image on the display means 26. It is thereby possible to display the applicable map image in the blank portion of the FIG. 2(*a*).

In accordance with such a configuration, when the terminal device 20 has moved near the boundary of an adjacent area and there is a portion of the map image that cannot be displayed due to insufficient map information, the terminal device can specify a spot in the deficient portion, calculate the position information of the spot, request a map from the server 40 which mediates providing of map information, obtain the corresponding map information from the map information providing server that provides map information of adjacent areas via the server 40 which mediates providing of map information, and synthesize and display the map information already in its possession and the map information acquired via the server 40 which mediates providing of map information.

Figure 6:
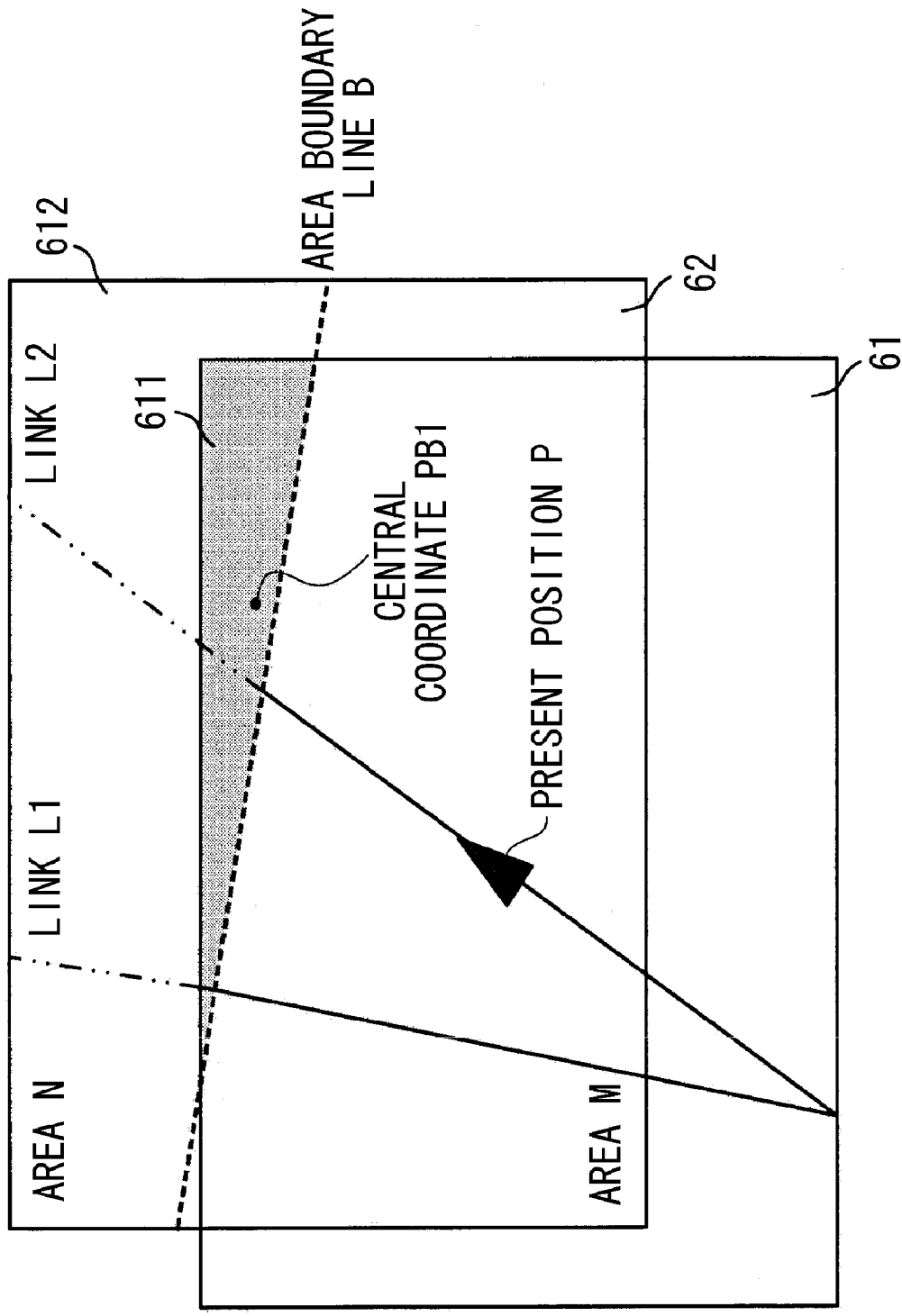
FIG. 6 is a schematic diagram for describing a concept of spot position information calculation for acquiring map information.

Next, the method used by the spot information calculation means 27 to calculate the spot position information will be described. FIG. 6 is a schematic diagram for describing another concept of spot position information calculation for acquiring map information. When the terminal device 20 has approached the boundary (boundary line B) between the area M and the area N from the area M, the map information providing server 30BM in which the area M is the service area does not have the map information of the area N, the map image displayed on the display means 26 is only the map image of the area M, and the map information of adjacent area N cannot be displayed. Therefore, the portion where the map image of the area N should be displayed is blank. In FIG. 6, the present position of the terminal device 20 is marked by a black triangular present position mark P.

Link L1 and Link L2 represent road links, and the movement vector of the terminal device 20 in the example of FIG. 6 is on the road link L2. When the terminal device 20 continues movement toward the boundary line B between area M and area N, the map image also changes from the display image 61 to the display image 62 as the present position P changes, and a blank portion 611 that the map image does not display also increases in the manner of a blank portion 612. Here, the terminal device 20 specifies an arbitrary spot that belongs to the blank portion of the display image and calculates the position information (spot position information). The area N that corresponds to the blank portion which includes the spot can be specified when the position information of the specified spot belonging to the blank portion is calculated.

As long as the area N can be specified, the map information providing system BN and the map information providing server 30BN that provided the map information of the area N can be specified. In view of this fact, the terminal device 20 adds the spot position information to the map download request, transmits the result to the server 40 which mediates providing of map information, and specifies the applicable map information providing system 30N and the map information providing server 30BN on the basis of the spot position information in the server 40 which mediates providing of map information. The server 40 which mediates providing of map information can thereby acquire the map information of the area BN from the map information providing server 30BN and provide the map information to the terminal device 20.

Accordingly, in the terminal device 20, the spot information calculation means 27 calculates the latitude and longitude of the map information as the spot position information on the basis of the coordinates (vertical and horizontal coordinates of the display screen) of the central position PB1 of a blank portion 611 in the display image 61. As long as the coordinates of the central position PB1 are known, the latitude and longitude, which are the position information of the spot, can be readily converted from the map image of the displayed area BM. As used herein, the term central position PB1 refers to the center position of the surface area of the blank portion, but no limitation is imposed thereby, and the term may also specify any spot in a blank portion.

For example, the spot position information may be calculated on the basis of the onscreen coordinates of the display position of an estimated position of the terminal device 20 after a predetermined length of time on the link L2 that the movement vector is facing in the present position P of the terminal device 20. It is also possible to use the latitude and longitude of the present position acquired by the present position acquiring means 23 as the spot position information in the case that the terminal device 20 has moved and entered the adjacent area N (the blank portion of the map image). In this case, the present position mark P cannot be displayed on the screen because the position of the terminal device 20 is in a blank portion for which there is no map information.

In accordance with this configuration, the terminal device 20 can readily determine whether it is necessary to acquire map information of an adjacent area on the basis of the map image displayed on the display means 26, and can readily specify the spot of a deficient portion and calculate the position information of the spot. [The terminal device 20] can also readily specify the spot of a deficient portion on the basis of the coordinates of the display screen and calculate the position information of the spot.

Figure 7:
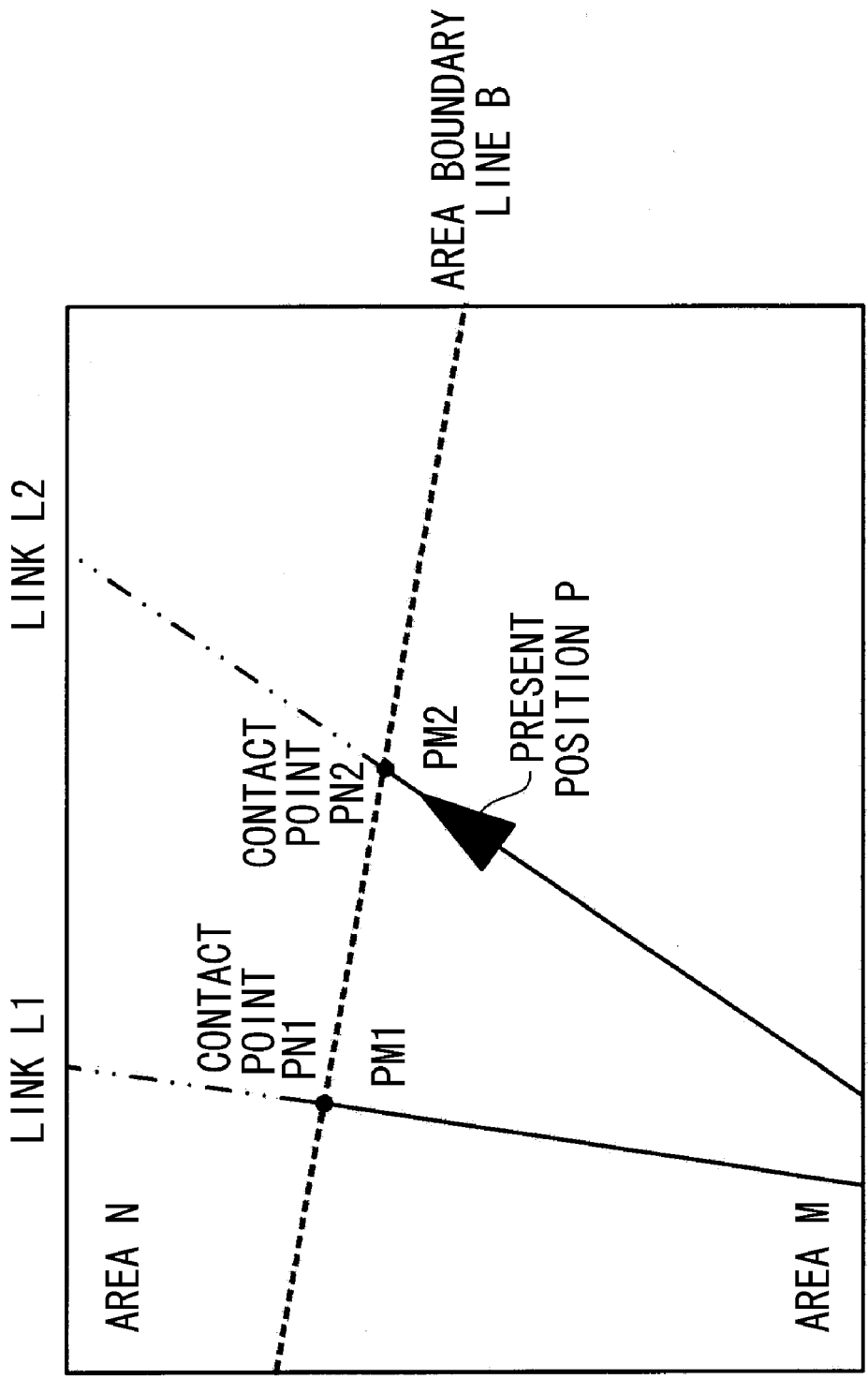
FIG. 7 is a schematic diagram for describing another concept of spot position information calculation for acquiring map information.

The spot position information may also be calculated using another method. FIG. 7 is a schematic diagram for describing another concept of spot position information calculation. The method for calculating the spot position information shown in FIG. 7 can be used in the case that the map information providing server (e.g., the map information providing server 30BM, the map information providing server 30BN) has the navigation function with respect to FIG. 12. In other words, the map information providing server 30BM and the map information providing server 30BN have as contact point information the information of the spot which is a candidate contact point with other areas for a route search from a departure point to a destination straddling areas. In FIG. 7, the reference numerals PM1, PM2, PN1, and PN2 represent candidate contact points.

In FIG. 7, the present position of the terminal device 20 is a spot represented by a black triangular present position mark (present position mark P). The terminal device 20 has the map information of the area BM and displays the map image, but does not have the map information of the area BN nor the map information that corresponds to the area BN across the area boundary line B, and the image is blank; and the vector information does not have the portion that corresponds to the area BN. In view of this situation, the spot information calculation means 27 extracts candidate contact points PM1, PM2, specifies a spot for which there is not vector information ahead from the candidate contact point PM2 on the link L2 where the present position is located, and calculates the position information (latitude and longitude) in the map information of the applicable spot. Calculation of the position information can be carried out on the basis of the coordinates of the spot on the display screen in the same manner of FIG. 6.

In accordance with this configuration, the terminal device 20 can readily determine whether it is necessary to acquire map information of an adjacent area on the basis of the map image displayed on the display means 26, and can readily specify the spot of a deficient portion using contact point information between different areas and calculate the position information of the spot.

Figure 8:
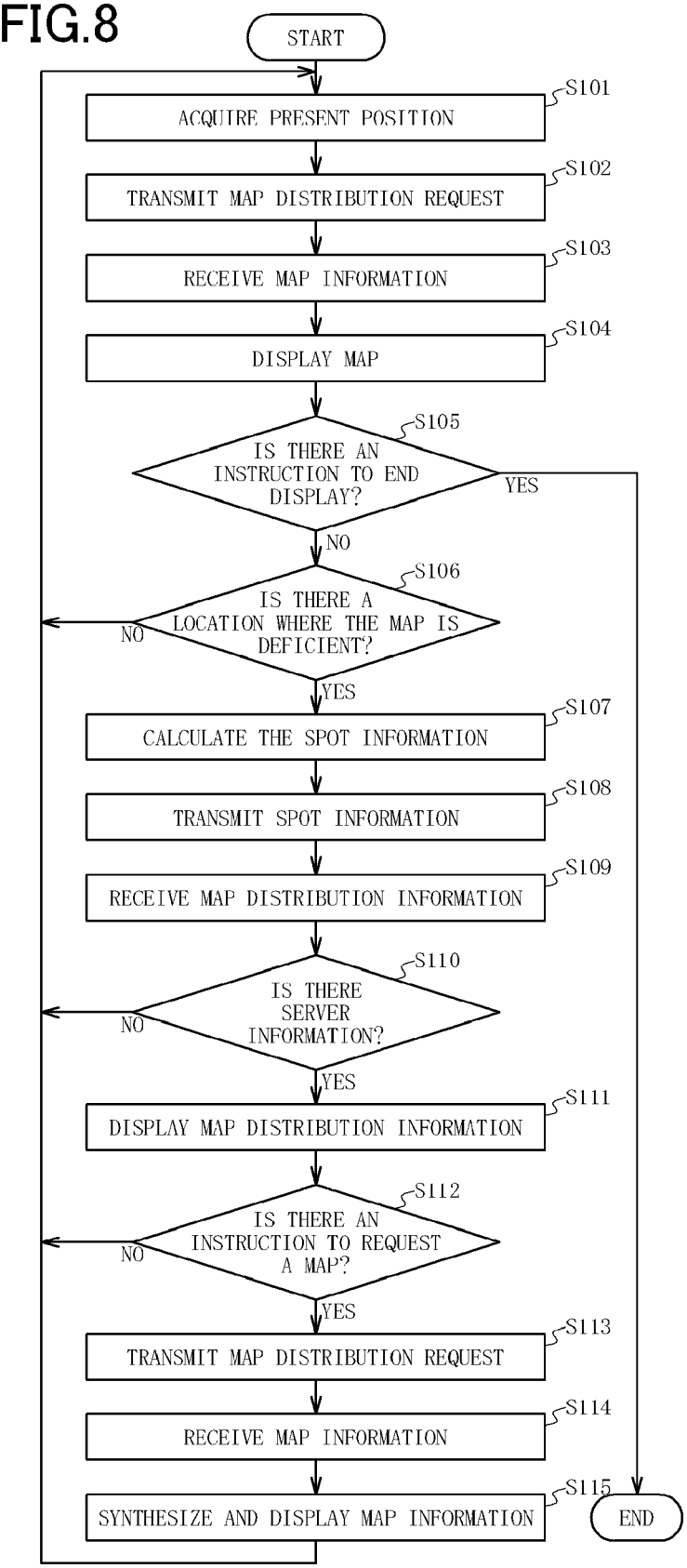
FIG. 8 is a flowchart showing the processing procedures in the terminal device.

Following is a description of the processing procedures of the terminal device 20 described above. FIG. 8 is a flowchart showing the processing procedures in the terminal device 20. Present position acquisition means 106 acquires the present position in step S101 when the terminal device 20 carries out processing for displaying route guidance or a map that includes the present position, as shown in FIG. 8. Next, in step S102, the map distribution request that includes the present position acquired in step S101 is transmitted to the map information providing server (e.g., the map information providing server 30BM (see FIGS. 6 and 7)).

Next, the process proceeds to step S103, and when the map data is received from the map information providing server 30BM, the map image is displayed on the display means 26 in step S104. In step S105, map display processing is ended in the case that input has been received from the operation input means 24 instructing an end of displaying.

In the case that there is no input for ending displaying in step S105, the process proceeds to step S106 and a judgment is made as to whether there is deficient location (blank portion) in the map display area (display screen) displayed on the display means 26. FIG. 2 is a view showing an example in which a map has been displayed in accordance with the map data.

As described with reference to FIG. 2(a), the user (terminal device 20) belongs to area M and is connected to the map information providing system BM which provides map information service to the area M, in which case the user does not have the map data of a different area N. Accordingly, the portion of the map information that corresponds to the area N is blank and not displayed because the user does not have the map information and the data is insufficient, as shown in FIG. 2(a).

The determination of whether there is such a deficient location (blank portion) can be made using various criteria. It is possible to judge that there is a deficient location in the case that a predetermined amount of deficient location has appeared on the display screen. It is possible to judge that there is a deficient location when the present position has arrived at the area N, as described with reference to FIGS. 6 and 7. In the case that there is no deficient location in step S106, the process returns to step S101.

In the case that there is a blank portion (deficient location) in the map image in step S106, the process proceeds to step S107, the spot information calculation means 27 establishes a specific spot belonging to the blank portion, and calculates the position information (e.g., latitude and longitude) of the spot. The method for establishing a specific spot and the method for calculating the position information (spot position information) in the map information of the spot are the methods described with reference to FIGS. 6 and 7.

When the spot position information is calculated in step S107, the terminal device 20 transmits a map distribution request (map download request) for requesting a download of the map information that includes the spot position information in the map information providing server 30M in step S108. In step S109, the information related to the map download request is received from the map information providing server 30BM. The information related to the map distribution of the map request target spot includes the existence of a map data distribution server of an area that includes the map request target spot, the existence of fees for using the system, and other information.

Next, the process proceeds to step S110, the information related to map distribution received in step S109 is examined and a judgment is made in relation to whether there is information of the applicable map information providing server. In the case that information of the map information providing server is not present in the information related to map distribution, the process returns to step S101. In the case that information of the map information providing server is present in the information related to map distribution, the process proceeds to step S111 and the map distribution information is displayed on the display means 26. For example, an inquiry may be made to determine whether the user will download the information, as shown in FIG. 2(b). In another configuration example, it is possible to display that a service subscription or a fee is required in order to receive map distribution.

Next, the process proceeds to step S112 and determines whether there is an instruction to distribute map information related to the deficient location. In the case that there is no instruction to distribute map information related to the deficient location, the process returns to step S101. In the case that there is an instruction to distribute the map information related to the deficient location, the process proceeds to step S113.

In step S113, the terminal device 20 transmits a map download request (map distribution request) to the map information providing server 30BM. The map download request is transmitted to the server 40 which mediates providing of map information. The terminal device 20 receives the applicable map information from the map information providing server 30BM in step S114. This map information is the map information acquired from the map information providing server 30BN (map information providing system BN) of another area via the server 40 which mediates providing of map information.

Next, in step S115, the terminal device 20 uses the map synthesis means 28 to synthesize along the boundary line B (see FIGS. 6 and 7) the map information of the area BM already in its possession and the map information of the area BN received via the server 40 which mediates providing of map information, and displays the synthesized map information on the display means 26. The above processing makes it possible to display a map image of the areas BM and BN without a blank portion.

It is possible to request a map download from the server which mediates providing of map information in advance without calculating the spot position information in accordance with the present position in the case that the terminal device 20 has performed a route search in advance using a map information providing server that has a navigation function and already has route guidance information, and it is known that the map image belonging to the area for which another map information providing system provides service will be displayed when the guidance route is displayed. In this case, the terminal device 20 specifies an arbitrary spot in the adjacent area with the aid of the spot information calculation means 27 by using the guidance route information to calculate the spot position information of the spot.

Figure 9:
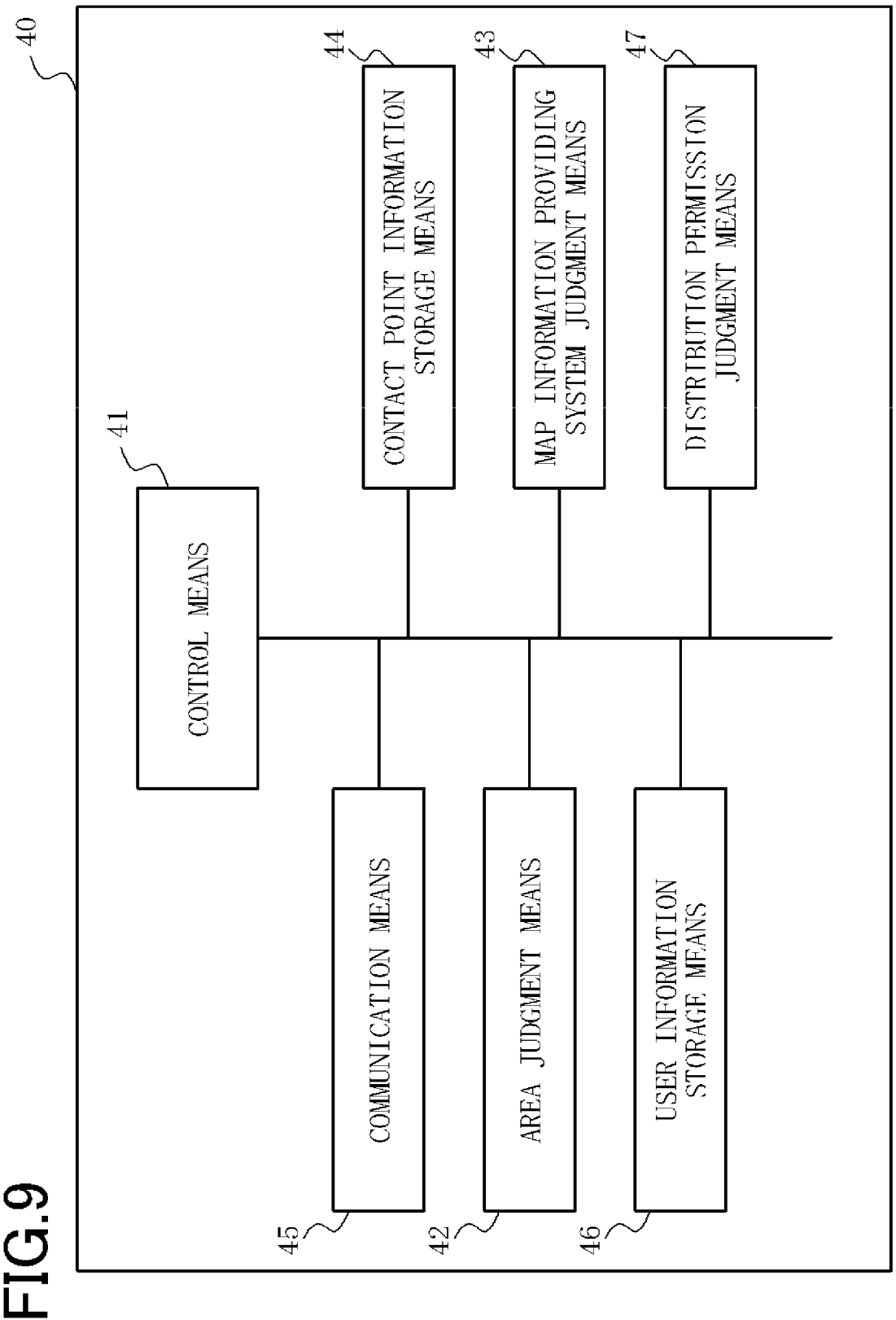
FIG. 9 is a block diagram showing the configuration of the server which mediates providing of map information.

Next, the configuration, function, and operation of the server 40 which mediates providing of map information will be described. FIG. 9 is a block diagram showing the configuration of the server 40 which mediates providing of map information. The server 40 which mediates providing of map information is composed of control means 41 for performing control; map information providing system judgment means 43 for determining the map information providing system and map information providing server that can provide the map information of the spot from the spot position information included in the map download request (map distribution request); contact point information storage means 44 for storing a contact point information table that is used for modifying external request signals from the map position information contained in the map distribution request; communication means 45 for transceiving information with the exterior; user information storage means 46 for correlating and storing user information and identification information contained in the map distribution request; and distribution permission judgment means 47 for judging whether map information can be provided on the basis of user information (whether the user is permitted to receive map distribution).

Figure 10:
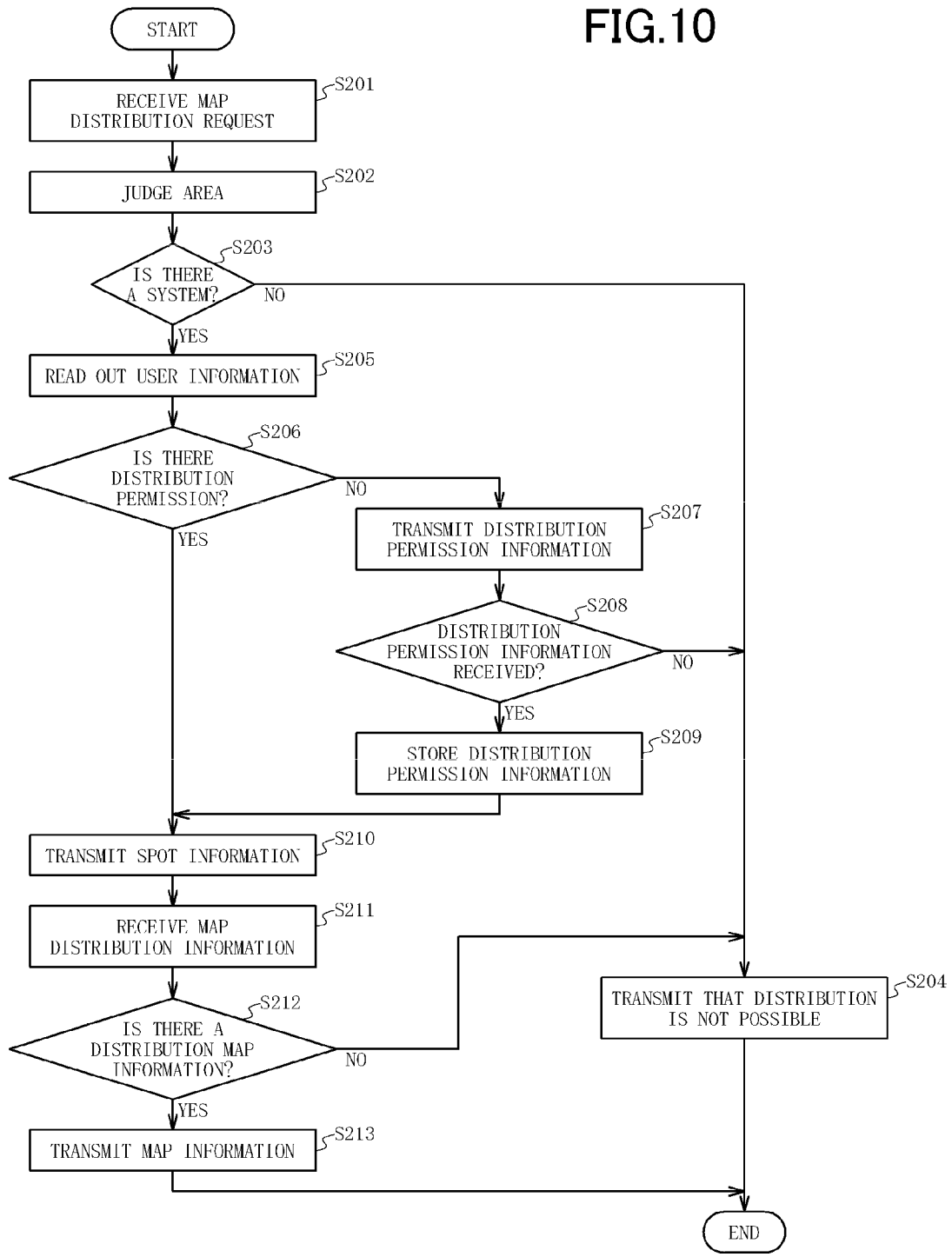
FIG. 10 is a flowchart showing the processing procedures in the server which mediates providing of map information.

FIG. 10 is a flowchart showing the processing procedures in the server 40 which mediates providing of map information of FIG. 9. When the server 40 which mediates providing of map information receives a distribution request for map information from, e.g., the map information providing system BM (map information providing server 30BM) of FIGS. 6 and 7 via a network in step S201, as shown in FIG. 2, an area judgment means 42 judges whether the distribution-target spot corresponds to the area for which the map information providing system provides service on the basis of the spot position information contained in the map distribution request. The map distribution request includes user identification information of the terminal device 20 and the spot position information (latitude and longitude information) calculated by the spot information calculation means 27 of the terminal device 20 as described above.

Next, in step S203, the map information providing system judgment means 43 judges the map information providing system that will provide service in relation to the area judged in step S202. For example, the map information providing system BN (map information providing server 30BN) is judged in FIGS. 6 and 7. In the case that the applicable map information providing system does not exist, the process proceeds to step S204 and the server 40 which mediates providing of map information transmits the fact that there is no system for providing the requested map information and the map information cannot be distributed, whereupon processing is ended.

In the case that there is an applicable map information providing system and map information providing server (in the case of FIGS. 6 and 7, the map information providing system BN and map information providing server 30BN), the process proceeds to step S205 and the user information is read out from the user information storage means 46 on the basis of the user identification information contained in the map download request. The process further proceeds to step S206, the distribution permission judgment means 47 judges whether the user has distribution request permission (user registration or the like) in the map information providing system BM (map information providing server 30BM) on the basis of the user information read out from the user information storage means 46 in step S205. Distribution request permission refers to obtainment of permission by the terminal device 20 and the user to receive map distribution from an external map information providing server, and is the case in which permission has been received in advance via user registration in the map information providing system and the map information providing server.

In the case there is no distribution permission in step S206, the process proceeds to step S207 and the fact that there is no distribution permission is transmitted to the map information providing server 30BN of the map information request destination. The map information providing server 30BN which received this notification determines whether the terminal device 20 of the request origination and the user thereof is registered as a user in the system on the basis of the user information contained in the map distribution request, and returns the distribution permission information to the server 40 which mediates providing of map information in the case that the user is a registered user. The server 40 which mediates providing of map information determines whether the distribution permission information has been received in step S208.

When the server 40 which mediates providing of map information determines that distribution permission information has not been received in step S208, the fact that there is not distribution permission and that map information cannot be distributed is transmitted from the system that provides the requested map information to the map information providing server 30BM, which is the origination of the request, and the process is ended.

When the server 40 which mediates providing of map information determines that distribution permission information has been received in step S208, the distribution permission information is stored in the user information storage means 46 in step S209, and the process proceeds to step S210. The distribution permission information includes information of the map information providing system BN and the map information providing server 30BN that transmitted the distribution permission information.

Next, the server 40 which mediates providing of map information transmits the spot position information in step S210 to the map information providing server 30BN for which distribution permission information has been obtained, and receives the applicable map information from the map information providing server 30BN in step S211. In step S212, it is determined whether the applicable map information was successfully received. The process is ended if the applicable map information could not be received. If the applicable map information was received, the server 40 which mediates providing of map information transmits in step S213 the map information to the map information providing system BM (map information providing server 30BM), which is the source of the request, and the process is ended.

The map information providing server 30BM which received the map information from the server 40 which mediates providing of map information distributes the map information to the terminal device 20, which is the origination of the request, and the terminal device 20 synthesizes and displays on the display means 26 the map information of the area BM already in its possession and the map information of the area BN received via the server 40 which mediates providing of map information, as described in the flowchart of FIG. 8.

Next, a common route search method will be described. The road network database 37 is configured in the following manner in the map information providing servers 30A, and 30B1 to 30BM. For example, in the case that a road is composed of roads A, B, and C, as shown in FIG. 11, the end points, intersections, curve points, and the like of the roads A, B, and C are nodes, and roads connecting between nodes are expressed by directional links, and are composed of node data (node latitude and longitude), link data (link number), and link cost data in which the link cost of each link is used as data (link distance, or required time to travel a link).

In other words, in FIG. 11, Nn (○) and Nm (◉) indicate nodes, and Nm (◉) indicates a road intersection. The links having directionality connected between the nodes are indicated by arrows (solid, dotted, and chain-dotted). The links include links that face in the upward and downward directions of the road, but in FIG. 11, only links oriented in the direction of the arrows are shown in order to simplify the diagram.

In the case that a route search is carried out using such road network data as the route search database, the links connecting from the node of the departure point to the node of the destination are followed, the link costs are totaled, and the route having the lowest total link cost is searched and guidance is provided. In other words, in FIG. 11, in the case that a route search is carried out using the node AX as the departure point and the node CY as the destination, the links are sequentially followed by traveling road A from node AX, and making a right turn at the second intersection to enter road C and arrive at the node CY. The link costs are totaled and the route having the lowest total value of the link costs is searched and guidance is provided.

In FIG. 11, other routes that lead from node AX to node CY are not shown, but other such routes actually exist. Therefore, a plurality of routes that can lead from the node AX to the node CY are searched in the same manner, and the route having the lowest link costs among the routes is determined to the be the optimal route. This technique is carried out by, e.g., a well-known method referred to as the Dijkstra method.

In contrast, the transportation network database 36 for route searches using modes of transportation is configured so that the routes of modes of transportation are expressed in a network that corresponds to roads, stations are nodes, and intervals between stations are links. For example, in the case that the route is composed of transportation lines A, B, and C, the stations (airports on aircraft routes) set on transportation lines A, B, and C are used as nodes, the intervals connecting between nodes are expressed by directional links, and are composed of node data (node latitude and longitude) and link data (link number) as network data.

However, the transportation network has link costs that are essentially different from those of a road network. In other words, in a road network, the link costs are fixed and static, but in a transportation network, there is a plurality of trains and aircraft (hereinbelow, the routes of individual trains, aircraft, and the like are referred to as transportation means) that operate along transportation lines. Therefore, the departure time from a node for each transportation means and the arrival time at the next node are different and handled as links having different time information for individual transportations means. Such transportation network data and the road network data are joined together to carry out a route search, thereby making it possible to carry out a comprehensive route search that includes automobiles, walking, and modes of transportation.

The invention claimed is:

1. A system which mediates providing of map information comprising a plurality of map information providing systems and a server which mediates providing of map information and which is connected to said map information providing systems, the map information providing systems having a map information providing server in which a predetermined area is used as a service-providing area and which is provided with map data storage means for accumulating map data of the area, and a terminal device connected to said map information providing server and provided with display means for displaying a map image on the basis of map information, the system which mediates providing of map information characterized in that:

said terminal device comprises map acquisition judgment means for judging whether acquisition of map information is required, spot information calculation means for calculating spot position information for specifying map information to be acquired, and map synthesis means; and, in a case where said map acquisition judgment means has judged that map information must be acquired, transmits spot position information calculated by said map information calculation means to said server which mediates providing of the map information, via a first map information providing server in which the area in which the terminal device is positioned is used as the map information providing service area;

said server which mediates providing of map information comprises area judgment means for judging a service area which provides map information including the spot on the basis of said spot position information, and map information providing system judgment means for judging the map information providing system which will provide map information in the service area judged by the area judgment means; and requests providing of map information that includes the spot on the basis of said spot position information from a second map information providing server constituting the map information providing system judged by said map information providing system judgment means; and said terminal device synthesizes the map information held by the terminal device and the map information provided by said second map information providing server using said map synthesis means and displays the synthesized map information on said display means.

2. The system which mediates providing of map information according to claim 1, characterized in that said terminal device is provided with present position acquisition means for acquiring a present position, and displays a map image including the present position on the basis of the present position acquired by said present position acquisition means; said map acquisition judgment means judges whether the acquisition of map information is required on the basis of whether there exists a portion where the map image is not displayed on the display screen of said display means; and said spot information calculation means determines a specific spot included in said undisplayed map image, and calculates the position information of the spot.

3. The system which mediates providing of map information according to claim 2, characterized in that said spot information calculation means calculates, on the basis of a display area of a deficient portion of the map image not displayed on the display screen of said display means, a predetermined coordinate position of the deficient portion; determines a specific spot on the map information on the basis of the coordinate position; and calculates the position information on the map information of the specific spot.

4. The system which mediates providing of map information according to claim 2, characterized in that said map acquisition judgment means judges whether acquisition of map information is required on the basis of whether there is a portion in which the map image is not displayed on the display screen of said display means; and said spot information calculation means extracts, on the basis of the map information displayed on said display means, contact point information for connecting the map image displayed on said display screen and the map information that includes the map image not displayed on said display screen, specifies a spot that does not have vector information of a link that corresponds to the contact point, and calculates position information of the spot on the map information.

5. The system which mediates providing of map information according to any of claims 1 to 4, characterized in that said server which mediates providing of map information comprises user information storage means for storing service usage information that corresponds to user information received from each of the map information providing servers, and distribution permission judgment means for judging whether to permit providing of map information in accordance with the user information stored in the user information storage means, wherein said terminal device is provided with user identification information storage means, and transmits user identification information stored in said user identification information storage means together with spot information calculated by said spot information calculation means to said server which mediates providing of map information via the first map information providing server in which the area in which the terminal device is positioned is used as the map information providing service area;

said server which mediates providing of map information judges whether there is distribution permission in said second map information providing server on the basis of said user information when the map information including the spot is requested on the basis of said spot position information from the second map information providing server constituting the map information providing system judged by said map information providing system judgment means on the basis of the user information and spot position information received from said first map information providing server, transmits said spot position information to the second map information providing server in the case that there is distribution permission, and transmits information indicating that there is no distribution permission to said first map information distribution server in the case that there is no distribution permission.

6. A server which mediates providing of map information connected to a plurality of map information providing systems, and to the plurality of map information providing systems, said plurality of map information providing systems having a map information providing server in which a predetermined area is used as a service-providing area and which is provided with map data storage means in which map data of the area is accumulated, and a terminal device connected to said map information providing server and provided with display means for displaying a map image on the basis of map information, the server which mediates providing of map information characterized in that:

said terminal device comprises map acquisition judgment means for judging whether map information needs to be acquired, spot information calculation means for calculating spot position information for specifying map information to be acquired, and map synthesis means; and, in a case where said map acquisition judgment means has judged that map information must be acquired, transmits spot position information calculated by said map information calculation means to said server which mediates providing of the map information, via a first map information providing server in which the area in which the terminal device is positioned is used as the map information providing service area;

said server which mediates providing of map information comprises area judgment means for judging a service area which provides map information including the spot on the basis of said spot position information, and map information providing system judgment means for judging the map information providing system which will provide map information in the service area judged by the area judgment means; and requests providing of map information that includes the spot on the basis of said spot position information from a second map information providing server constituting the map information providing system judged by said map information providing system judgment means; and said terminal device synthesizes the map information held by the terminal device and the map information provided by said second map information providing server using said map synthesis means; and displays the synthesized map information on said display means.

7. The server which mediates providing of map information according to claim 6, characterized in that said terminal device is provided with present position acquisition means for acquiring a present position, and displays on said display means a map image including the present position on the basis of the present position acquired by said present position acquisition means; said map acquisition judgment means judges whether acquisition of map information is required on the basis of whether there exists a portion where the map image is not displayed on the display screen of said display means; and said spot information calculation means determines a specific spot included in said undisplayed map image, and calculates the position information of the spot.

8. The server which mediates providing of map information according to claim 7, characterized in that said spot information calculation means calculates, on the basis of a display area of a deficient portion of the map image not displayed on the display screen of said display means, a predetermined coordinate position of the deficient portion, determines a specific spot on the map information on the basis of the coordinate position, and calculates the position information on the map information of the specific spot.

9. The server which mediates providing of map information according to claim 7, characterized in that said map acquisition judgment means judges whether acquisition of map information is required on the basis of whether there exists a portion where the map image is not displayed on the display screen of said display means; and said spot information calculation means extracts, on the basis of the map information displayed on said display means, contact point information for connecting the map image displayed on said display screen and the map information that includes the map image not displayed on said display screen, specifies a spot that does not have vector information of a link that corresponds to the contact point, and calculates position information of the spot on the map information.

10. The server which mediates providing of map information according to any of claims 6 to 9, characterized in that said server which mediates providing of map information comprises user information storage means for storing service usage information that corresponds to user information received from each of the map information providing servers, and distribution permission judgment means for judging whether to permit providing of map information in accordance with the user information stored in the user information storage means, wherein said terminal device is provided with user identification information storage means, and transmits user identification information stored in said user identification information storage means together with spot information calculated by said spot information calculation means to said server which mediates providing of map information via the first map information providing server in which the area in which the terminal device is positioned is used as the map information providing service area;

said server which mediates providing of map information judges whether there is distribution permission in said second map information providing server on the basis of said user information when provision of the map information including the spot is requested on the basis of said spot position information from the second map information providing server constituting the map information providing system judged by said map information providing system judgment means on the basis of the user information and spot position information received from said first map information providing server, transmits said spot position information to the second map information providing server in the case that there is distribution permission, and transmits information indicating that there is no distribution permission to said first map information distribution server in the case that there is no distribution permission.

11. A method for providing map information in a system which mediates providing of map information comprising a plurality of map information providing systems and a server which mediates providing of map information and which is connected to said map information providing systems, the map information providing systems having a map information providing server in which a predetermined area is used as a service-providing area and which is provided with map data storage means in which map data of the area is accumulated, and a terminal device connected to said map information providing server and provided with display means for displaying a map image on the basis of map information, the method for providing map information in the system which mediates providing of map information characterized in that:

said terminal device is provided with map acquisition judgment means for judging whether acquisition of map information is required, spot information calculation means for calculating spot position information for specifying map information to be acquired, and map synthesis means; and the method, in a case where said map acquisition judgment means has judged that map information must be acquired, has a step of transmitting spot position information calculated by said map information calculation means to said server which mediates providing of the map information, via a first map information providing server in which the area in which the terminal device is positioned is used as the map information providing service area;

said server which mediates providing of map information is provided with area judgment means for judging a service area which provides map information including the spot on the basis of said spot position information, and map information providing system judgment means for judging the map information providing system which will provide map information in the service area judged by the area judgment means; and the method has a step of requesting providing of map information that includes the spot on the basis of said spot position information from a second map information providing server constituting the map information providing system judged by said map information providing system judgment means; and the method has a step in which said terminal device has a step of synthesizing the map information held by the terminal device and the map information provided by said second map information providing server using said map synthesis means and displaying the synthesized map information on said display means.

12. The method for providing map information according to claim 11, characterized in that said terminal device is provided with present position acquisition means for acquiring a present position, and has a step of having a map image including the present position displayed on said display means on the basis of the present position acquired by said present position acquisition means; a step of having said map acquisition judgment means judge whether acquisition of map information is required on the basis of whether there exists a portion where the map image is not displayed on the display screen of said display means; and a step of having said spot information calculation means determine a specific spot included in said undisplayed map image, and calculating the position information of the spot.

13. The method for providing map information according to claim 12, characterized in comprising a step of having said spot information calculation means calculate, on the basis of a display area of a deficient portion of the map image not displayed on the display screen of said display means, a predetermined coordinate position of the deficient portion; and a step of determining a specific spot on the map information on the basis of the coordinate position, and calculating the position information on the map information of the specific spot.

14. The method for providing map information according to claim 12, characterized in comprising a step of having said map acquisition judgment means judge whether acquisition of map information is required on the basis of whether there exists a portion where the map image is not displayed on the display screen of said display means; and a step of having said spot information calculation means extract, on the basis of the map information displayed on said display means, contact point information for connecting the map image displayed on said display screen and the map information that includes the map image not displayed on said display screen, specify a spot that does not have vector information of a link that corresponds to the contact point, and calculate position information of the spot on the map information.

15. The method for providing map information according to any of claims 11 to 14, characterized in that:

said server which mediates providing of map information is provided with user information storage means for storing service usage information that corresponds to user information received from each of the map information providing servers, and distribution permission judgment means for judging whether to permit providing of map information in accordance with the user information stored in the user information storage means;

said terminal device is provided with user identification information storage means, and has a step of transmitting user identification information stored in said user identification information storage means together with spot information calculated by said spot information calculation means to said server which mediates providing of map information via the first map information providing server in which the area in which the terminal device is positioned is used as the map information providing service area;

said server which mediates providing of map information has a step of receiving, on the basis of said spot position information, a request to provide the map information including the spot to the second map information providing server, which constitutes the map information providing system judged by said map information providing system judgment means on the basis of the user information and spot position information received from said first map information providing server, whereupon a judgment is made as to whether there is distribution permission in said second map information providing server on the basis of said user information; a step of transmitting said spot position information to the second map information providing server in the case that there is distribution permission; and a step of transmitting information indicating that there is no distribution permission to said first map information distribution server in the case that there is no distribution permission.

16. A terminal device in a system which mediates providing of map information comprising a plurality of map information providing systems and a server which mediates providing of map information and which is connected to said map information providing systems, the map information providing systems having a map information providing server in which a predetermined area is used as a service-providing area and which is provided with map data storage means in which map data of the area is accumulated, and a terminal device connected to said map information providing server and provided with display means for displaying a map image on the basis of map information, said terminal device characterized in that:

said server which mediates providing of map information comprises area judgment means for judging a service area which provides map information including the spot on the basis of spot position information calculated by the terminal device, and map information providing system judgment means for judging the map information providing system which will provide map information in the service area judged by the area judgment means; and requests providing of map information that includes the spot on the basis of said spot position information from a second map information providing server constituting the map information providing system judged by said map information providing system judgment means; and said terminal device comprises map acquisition judgment means for judging whether acquisition of map information is required, spot information calculation means for calculating spot position information for specifying map information to be acquired, and map synthesis means; and, in a case where said map acquisition judgment means has judged that map information must be acquired, the terminal device transmits spot position information calculated by said map information calculation means to said server which mediates providing of the map information, via a first map information providing server in which the area in which the terminal device is positioned is used as the map information providing service area; synthesizes the map information held by the terminal device and the map information provided by said second map information providing server using said map synthesis means; and displays the synthesized map information on said display means.

17. The terminal device according to claim 16, characterized in that said terminal device is provided with present position acquisition means for acquiring a present position, and displays a map image including the present position on said display means on the basis of the present position acquired by said present position acquisition means; said map acquisition judgment means judges whether acquisition of map information is required on the basis of whether there exists a portion where the map image is not displayed on the display screen of said display means; and said spot information calculation means determines a specific spot included in said undisplayed map image, and calculates the position information of the spot.

18. The terminal device according to claim 17, characterized in that said spot information calculation means calculates, on the basis of a display area of a deficient portion of the map image not displayed on the display screen of said display means, a predetermined coordinate position of the deficient portion; determines a specific spot on the map information on the basis of the coordinate position; and calculates the position information on the map information of the specific spot.

19. The terminal device according to claim 17, characterized in that said map acquisition judgment means judges whether acquisition of map information is required on the basis of whether there exists a portion where the map image is not displayed on the display screen of said display means; and said spot information calculation means extracts, on the basis of the map information displayed on said display means, contact point information for connecting the map image displayed on said display screen and the map information that includes the map image not displayed on said display screen, specifies a spot that does not have vector information of a link that corresponds to the contact point, and calculates position information of the spot on the map information.

* * * * *